United States Patent
Izumi

(10) Patent No.: US 8,949,443 B2
(45) Date of Patent: Feb. 3, 2015

(54) COMMUNICATION APPARATUS, CONTROL METHOD, AND COMPUTER-USABLE MEDIUM FOR SELECTING A NETWORK FOR DATA TRANSMISSION

(75) Inventor: Michihiro Izumi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1333 days.

(21) Appl. No.: 10/559,612

(22) PCT Filed: Jun. 10, 2004

(86) PCT No.: PCT/JP2004/008499
§ 371 (c)(1),
(2), (4) Date: Dec. 2, 2005

(87) PCT Pub. No.: WO2004/111749
PCT Pub. Date: Dec. 23, 2004

(65) Prior Publication Data
US 2006/0136596 A1    Jun. 22, 2006

(30) Foreign Application Priority Data

Jun. 11, 2003    (JP) .................................. 2003-165861

(51) Int. Cl.
*G06F 3/12*    (2006.01)
*G06F 15/16*    (2006.01)
(Continued)

(52) U.S. Cl.
CPC .......... *H04N 1/0022* (2013.01); *H04L 12/5692* (2013.01); *H04L 29/06027* (2013.01); *H04N 1/00214* (2013.01); *H04L 65/1006* (2013.01); *H04L 67/06* (2013.01)
USPC .......... 709/228; 358/1.15; 358/438; 358/440; 709/230; 709/245

(58) Field of Classification Search
CPC ..... H04L 12/5692; H04L 12/58; H04L 29/06; H04L 61/10; H04L 61/157; H04L 65/1006; H04L 65/1069; H04L 67/14; H04M 1/00214; H04M 1/0022; H04M 1/00209; H04M 2201/0093; H04N 1/2535; H04N 7/0057; H04N 7/0069; H04N 7/0075
USPC .......... 709/230, 245, 228; 358/1.15, 438, 440
See application file for complete search history.

(56) References Cited

U.S. PATENT DOCUMENTS

| | | | | |
|---|---|---|---|---|
| 5,095,504 | A | 3/1992 | Nishikawa et al. | 379/162 |
| 5,361,299 | A | 11/1994 | Izumi | 379/252 |

(Continued)

FOREIGN PATENT DOCUMENTS

| | | | | |
|---|---|---|---|---|
| DE | 101 47 067 | | 8/2002 | |
| EP | 1 059 796 | | 12/2000 | ............ H04M 3/428 |

(Continued)

OTHER PUBLICATIONS

Newton, Harry, Newton's Telecom Dictionary, Feb. 2006, CMP Books, 22nd Ed., pp. 374 and 979.*

(Continued)

*Primary Examiner* — Daniel C Murray
(74) *Attorney, Agent, or Firm* — Fitzpatrick, Cella, Harper & Scinto

(57) ABSTRACT

In a communication apparatus corresponding to a voice-band analog communication path and a network communication path, high-speed and high-reliability data communication is achieved by selecting the appropriate communication path without any complicated user operation. The communication apparatus which performs IP communication and analog communication through an ADSL gateway obtains a communication partner IP address from an SIP proxy when a communication partner telephone number corresponds to a VoIP network, and transmits/receives communication data to/from the communication partner on an IP network based on a file transmission/reception protocol such as FTP, HTTP, or the like. The communication apparatus performs analog facsimile communication on a line switching network when the communication partner telephone number does not correspond to the VoIP network, and performs the analog facsimile communication when the communication partner corresponds to the VoIP network but does not have any digital communication means.

9 Claims, 20 Drawing Sheets

(51) Int. Cl.
*H04N 1/00* (2006.01)
*H04L 12/54* (2013.01)
*H04L 29/06* (2006.01)
*H04L 29/08* (2006.01)

(56) References Cited

U.S. PATENT DOCUMENTS

| | | | |
|---|---|---|---|
| 5,467,367 A | 11/1995 | Izumi et al. | 375/206 |
| 5,517,324 A * | 5/1996 | Fite et al. | 358/434 |
| 5,712,712 A * | 1/1998 | Sayward | 358/403 |
| 5,745,702 A * | 4/1998 | Morozumi | 709/249 |
| 5,940,598 A * | 8/1999 | Strauss et al. | 709/249 |
| 5,946,634 A * | 8/1999 | Korpela | 455/552.1 |
| 6,058,169 A * | 5/2000 | Bramnick et al. | 379/100.01 |
| 6,075,783 A * | 6/2000 | Voit | 370/352 |
| 6,075,847 A * | 6/2000 | Leung | 379/100.17 |
| 6,147,774 A * | 11/2000 | Hamadani et al. | 358/442 |
| 6,205,139 B1 * | 3/2001 | Voit | 370/389 |
| 6,230,189 B1 * | 5/2001 | Sato et al. | 709/206 |
| 6,243,373 B1 * | 6/2001 | Turock | 370/352 |
| 6,259,538 B1 * | 7/2001 | Amit et al. | 358/442 |
| 6,335,966 B1 * | 1/2002 | Toyoda | 379/100.06 |
| 6,363,065 B1 * | 3/2002 | Thornton et al. | 370/352 |
| 6,400,719 B1 * | 6/2002 | Chimura et al. | 370/395.31 |
| 6,437,873 B1 * | 8/2002 | Maeda | 358/1.15 |
| 6,477,243 B1 * | 11/2002 | Choksi et al. | 379/100.06 |
| 6,487,407 B2 * | 11/2002 | Goldberg et al. | 455/433 |
| 6,539,015 B2 * | 3/2003 | Voit | 370/389 |
| 6,542,472 B1 * | 4/2003 | Onuma | 370/253 |
| 6,603,569 B1 * | 8/2003 | Johnson et al. | 358/1.15 |
| 6,618,165 B1 * | 9/2003 | Sehgal | 358/1.15 |
| 6,639,974 B2 * | 10/2003 | Bashoura et al. | 379/100.14 |
| 6,671,063 B1 * | 12/2003 | Iida | 358/1.15 |
| 6,690,304 B1 * | 2/2004 | Shirokura et al. | 341/50 |
| 6,707,793 B1 * | 3/2004 | Yamashita | 370/237 |
| 6,714,988 B2 * | 3/2004 | Takemoto et al. | 709/249 |
| 6,754,708 B1 * | 6/2004 | Sabatier et al. | 709/227 |
| 6,778,555 B1 * | 8/2004 | Chung | 370/467 |
| 6,779,020 B1 * | 8/2004 | Henrick | 709/206 |
| 6,785,266 B2 * | 8/2004 | Swartz | 370/352 |
| 6,785,748 B2 | 8/2004 | Mikuni et al. | 710/15 |
| 6,801,952 B2 * | 10/2004 | Belzile | 709/249 |
| 6,807,166 B1 * | 10/2004 | Ohura | 370/352 |
| 6,810,036 B1 * | 10/2004 | Dang et al. | 370/356 |
| 6,836,541 B2 | 12/2004 | Inoue et al. | 379/212.01 |
| 6,856,431 B2 * | 2/2005 | Ohta | 358/402 |
| 6,891,826 B2 * | 5/2005 | Onuma | 370/353 |
| 6,909,909 B2 | 6/2005 | Izumi | 455/557 |
| 6,928,082 B2 * | 8/2005 | Liu et al. | 370/401 |
| 6,956,843 B1 * | 10/2005 | Breivik et al. | 370/352 |
| 6,961,137 B1 | 11/2005 | Tamura | 358/1.15 |
| 6,963,427 B1 * | 11/2005 | Tanimoto | 358/400 |
| 6,967,739 B2 * | 11/2005 | Tanimoto | 358/1.16 |
| 6,993,012 B2 * | 1/2006 | Liu et al. | 370/352 |
| 7,035,674 B1 * | 4/2006 | Holder et al. | 455/566 |
| 7,057,755 B2 * | 6/2006 | Yoshida | 358/1.15 |
| 7,076,554 B1 * | 7/2006 | Kobayashi | 709/227 |
| 7,088,994 B2 * | 8/2006 | Uhlmann | 455/416 |
| 7,092,380 B1 * | 8/2006 | Chen et al. | 370/352 |
| 7,110,791 B2 | 9/2006 | Izumi | 455/557 |
| 7,116,435 B2 * | 10/2006 | Tanimoto | 358/1.15 |
| 7,155,520 B2 * | 12/2006 | Matsumoto | 709/227 |
| 7,173,726 B2 | 2/2007 | Izumi | 358/1.15 |
| 7,215,438 B2 * | 5/2007 | Chen | 358/1.15 |
| 7,245,391 B2 * | 7/2007 | Nishimura | 358/1.15 |
| 7,283,270 B2 * | 10/2007 | Boire-Lavigne et al. | 358/1.15 |
| 7,289,618 B2 * | 10/2007 | Lim et al. | 379/211.01 |
| 7,305,676 B1 * | 12/2007 | Boll et al. | 718/107 |
| 7,411,703 B2 * | 8/2008 | Adler et al. | 358/442 |
| 7,453,606 B2 * | 11/2008 | Maeda | 358/438 |
| 7,576,882 B2 * | 8/2009 | Mehta et al. | 358/1.15 |
| 7,577,131 B2 * | 8/2009 | Joseph et al. | 370/351 |
| 7,620,682 B1 * | 11/2009 | Pravetz et al. | 709/203 |
| 7,693,989 B2 * | 4/2010 | Aoki et al. | 709/225 |
| 7,706,354 B2 * | 4/2010 | Usuba et al. | 370/352 |
| 7,734,783 B1 * | 6/2010 | Bourke et al. | 709/226 |
| 7,751,091 B2 * | 7/2010 | Kajiwara | 358/400 |
| 7,752,277 B2 * | 7/2010 | Hyakutake et al. | 709/206 |
| 7,791,748 B2 * | 9/2010 | Izumi et al. | 358/1.15 |
| 7,907,708 B2 * | 3/2011 | Walker et al. | 379/93.09 |
| 7,924,454 B2 * | 4/2011 | Boire-Lavigne et al. | 358/1.15 |
| 2001/0000441 A1 * | 4/2001 | Zinkov et al. | 358/1.15 |
| 2001/0014910 A1 * | 8/2001 | Bobo, II | 709/206 |
| 2001/0030760 A1 * | 10/2001 | Ohta | 358/1.9 |
| 2001/0035977 A1 * | 11/2001 | Adler et al. | 358/1.15 |
| 2002/0002609 A1 * | 1/2002 | Chung et al. | 709/223 |
| 2002/0018236 A1 * | 2/2002 | Musk et al. | 358/1.15 |
| 2002/0051146 A1 * | 5/2002 | Tanimoto | 358/1.9 |
| 2002/0054371 A1 * | 5/2002 | Tanimoto | 358/440 |
| 2002/0095516 A1 * | 7/2002 | Nada | 709/245 |
| 2002/0116464 A1 * | 8/2002 | Mak | 709/206 |
| 2002/0126317 A1 * | 9/2002 | Ohvo et al. | 358/402 |
| 2002/0196777 A1 * | 12/2002 | Wu et al. | 370/352 |
| 2003/0107776 A1 * | 6/2003 | Maeda | 358/402 |
| 2003/0123436 A1 * | 7/2003 | Joseph et al. | 370/352 |
| 2003/0133442 A1 * | 7/2003 | Onuma | 370/352 |
| 2003/0160998 A1 * | 8/2003 | Kuwahara | 358/1.15 |
| 2003/0164986 A1 * | 9/2003 | Boire-Lavigne et al. | 358/400 |
| 2003/0193696 A1 * | 10/2003 | Walker et al. | 358/402 |
| 2004/0021896 A1 * | 2/2004 | Chen | 358/1.15 |
| 2004/0047345 A1 * | 3/2004 | Joseph et al. | 370/352 |
| 2004/0062210 A1 * | 4/2004 | Genter et al. | 370/260 |
| 2004/0117498 A1 * | 6/2004 | Hashimoto et al. | 709/230 |
| 2004/0139209 A1 * | 7/2004 | Mussman et al. | 709/230 |
| 2004/0233475 A1 | 11/2004 | Mikuni et al. | 358/1.15 |
| 2005/0256934 A1 * | 11/2005 | Motoyama | 709/208 |
| 2006/0092926 A1 * | 5/2006 | Tang et al. | 370/352 |
| 2006/0146783 A1 * | 7/2006 | Yurchenko | 370/351 |
| 2006/0146784 A1 * | 7/2006 | Karpov et al. | 370/351 |
| 2006/0146792 A1 * | 7/2006 | Ramachandran et al. | 370/352 |
| 2007/0146804 A1 * | 6/2007 | Mehta et al. | 358/405 |
| 2007/0183412 A1 * | 8/2007 | Bennett | 370/352 |
| 2007/0268526 A1 * | 11/2007 | Ito et al. | 358/403 |
| 2007/0279699 A1 * | 12/2007 | Boire-Lavigne et al. | 358/400 |
| 2008/0112392 A1 * | 5/2008 | Mansfield | 370/352 |
| 2008/0117475 A1 * | 5/2008 | Ozawa et al. | 358/435 |
| 2009/0141708 A1 * | 6/2009 | Rodriguez et al. | 370/352 |
| 2010/0042737 A1 * | 2/2010 | Fujimoto et al. | 709/230 |
| 2010/0142707 A1 * | 6/2010 | Han et al. | 380/255 |
| 2011/0134914 A1 * | 6/2011 | Wasiel et al. | 370/353 |

FOREIGN PATENT DOCUMENTS

| | | |
|---|---|---|
| GB | 2 370 719 A | 7/2002 |
| JP | 9-247334 | 9/1997 |
| JP | 10-133967 | 5/1998 |
| JP | 2000-224354 A | 8/2000 |
| JP | 2000-278473 A | 10/2000 |
| JP | 2000-332940 A | 11/2000 |
| JP | 2000-354127 | 12/2000 |
| JP | 2001-016328 A | 1/2001 |
| JP | 2001-160866 A | 6/2001 |
| JP | 2001-197279 | 7/2001 |
| JP | 2002-101198 A | 4/2002 |
| JP | 2002-111948 A | 4/2002 |
| JP | 2002-176453 A | 6/2002 |
| JP | 2002-247130 A | 8/2002 |
| JP | 2002-252698 A | 9/2002 |
| JP | 2002-310389 A | 10/2002 |
| JP | 2003-152890 A | 5/2003 |
| JP | 2003-152892 A | 5/2003 |
| JP | 2003-165861 A | 6/2003 |
| JP | 2003-305606 A | 10/2003 |

OTHER PUBLICATIONS

B. Turner, "SIP, New Tide of IP Signaling/Protocol," Computer & Network LAN (Jul. 2002), vol. 20, No. 7 (and partial English translation).

* cited by examiner

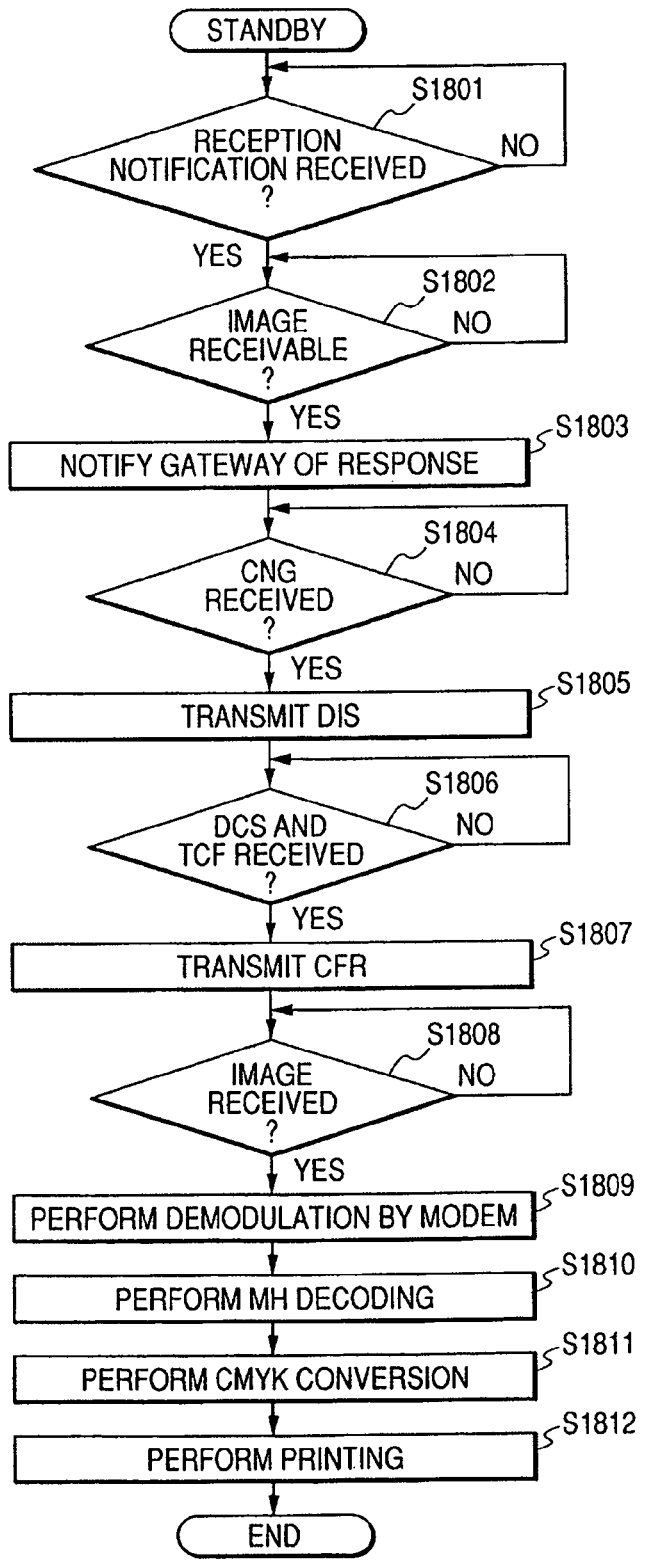

COMMUNICATION APPARATUS, CONTROL METHOD, AND COMPUTER-USABLE MEDIUM FOR SELECTING A NETWORK FOR DATA TRANSMISSION

TECHNICAL FIELD

The present invention relates to a communication apparatus which has an IP (Internet Protocol) communication means and transmits/receives communication data to/from a communication partner station identified by a telephone number, a control method of the communication apparatus, and a control program for the communication apparatus.

BACKGROUND ART

In recent years, a broadband communication line such as the ADSL (Asymmetric Digital Subscriber Line) or the like capable of performing high-speed data transmission is in widespread use. Here, the ADSL is characterized by using the same metallic cable as the existing subscriber's line, whereby the identical line can be used for both an analog telephone service and a network connection service. That is, it is possible by inserting a frequency division filter called a splitter between the communication line and a communication terminal to separate the line for transmitting a voice band signal and the line for transmitting digital data from each other.

Incidentally, when the above line is used for the analog telephone service, various configurations such as "ADSL modem+splitter+computer", "ADSL modem+splitter+router", and the like are conceivable as combinations of subscriber's devices. Moreover, for example, the configuration which integrally includes the ADSL modem and the splitter is conceivable as an ADSL gateway which takes account of sharing with a telephone.

The ADSL gateway like this is equipped with a modular jack so as to be able to connect the analog telephone to, e.g., the line for transmitting the voice band signal. Thus, a communication apparatus such as a telephone, a facsimile machine or the like is connected to the modular jack, whereby communication can be performed by means of the connected communication apparatus.

Moreover, the ADSL gateway like this is equipped with a connection interface of CSMA/CD (Carrier Sense Multiple Access with Collision Detection) such as Ethernet™ or the like so as to achieve high-speed digital communication. Thus, it is possible by connecting a PC (personal computer) or the like to such a CSMA/CD interface to be able to download various data at high speed from, e.g., a WWW (World Wide Web) server. Here, it should be noted that, in addition to the CSMA/CD interface, another interface such as USB (Universal Serial Bus) or the like is also used as the interface between the ADSL gateway and a network device such as a PC.

The terminal such as the PC which is connected to the server and thus used can achieve high-speed communication. However, the terminal such as the telephone, the facsimile machine or the like which performs data exchange in real time to a communication partner terminal through a line exchange network (i.e., an analog communication path) generally uses an analog band. Here, in an analog facsimile procedure, although any problem does not occur when binary (i.e., black and white) image data or the like is transmitted, a problem that a long communication time is necessary occurs when large-capacity color image data (according to a JPEG (Joint Photographic Experts Group) format or the like) obtained by means of a digital camera or the like is transmitted.

In order to be able to transmit communication data such as image data or the like at high speed, a procedure to connect the facsimile machine to the CSMA/CD interface, upload a packet of the image data to a file server (for example, by using a protocol such as FTP (File Transfer Protocol), HTTP (HyperText Transfer Protocol) or the like), and then download the packet data from the file server to a communication partner terminal is necessary. However, in that case, there is a problem that the communication partner terminal (i.e., a reception side) has to take the trouble to access the server for receiving the image data, and there is also a problem that real-time communication cannot be performed. Moreover, when a destination address on the reception side is notified to the server, or when the data is downloaded on the initiative of the reception side, a mechanism for notifying the reception side of data upload is necessary. In other words, it is difficult in that case to achieve data communication by a simple operation as in the conventional facsimile machine of only setting a mere communication partner's telephone number.

In consideration of the above point, Japanese Patent Application Laid-Open No. H10-107938 (called a document 1 hereinafter) discloses that image communication is performed through a server on an IP network. More specifically, in this document, a first terminal on an image transmission side calls a server concerning the first terminal, the first terminal is connected to a computer network through the called server concerning the first terminal, a second terminal being an image reception side is designated, a network server concerning the second terminal calls the second terminal, the first terminal transmits image data to the server concerning the second terminal through the computer network in the form suitable for the computer network, the server concerning the second terminal converts the received image data of the form suitable for the computer network into facsimile image, the server concerning the second terminal transmits the obtained facsimile image data to the second terminal through a public line, and the second terminal actually reproduces an image from the received facsimile image data.

Moreover, Japanese Patent Application Laid-Open No. H09-247334 (called a document 2 hereinafter), Japanese Patent Application Laid-Open No. H10-133967 (called a document 3 hereinafter), and the like propose various kinds of methods of transmitting an image in the form of an electronic mail by inputting an Internet address of a transmission destination.

Furthermore, Japanese Patent Application Laid-Open No. 2000-354127 (called a document 4 hereinafter), Japanese Patent Application Laid-Open No. 2001-197279 (called a document 5 hereinafter), and the like propose various kinds of methods of relaying facsimile image transmission on the Internet in real time by applying a protocol based on ITU-T (International Telecommunication Union Telecommunication Standardization Sector) Recommendation. T.38.

However, in the document 1, it is necessary for the transmission-source terminal to dial-up access to the server, perform a log-in process including an authentication procedure and the like, and further input the telephone number of the transmission-destination terminal. That is, it is impossible to easily perform image transmission only by inputting a destination's telephone number as in the conventional facsimile machine.

Moreover, in the documents 2 and 3, when the image is transmitted through the Internet, it is necessary for the transmission source side to input a mail address of the transmission destination at the reception side. Furthermore, to transmit the image in the form of the electronic mail, image data representing the image in question is once stored in a server, and it is then necessary for the reception side to access the server according to an electronic mail reading protocol such as POP (Post Office Profile) or the like and actually receive the image data.

In addition, in the documents 4 and 5, it is necessary to provide a dedicated gateway for the protocol based on ITU-T Recommendation T.38. Meanwhile, in these documents, because the ordinary telephone line is used between the terminal and the Internet, the obtained transmission speed is the same as that in the facsimile communication using the conventional line switching network.

DISCLOSURE OF THE INVENTION

An object of the present invention is to solve the above conventional problems. In other words, the present invention aims to provide a communication apparatus corresponding to a voice-band analog communication path and a network communication path, wherein high-speed and high-reliability data communication can be performed by selecting the appropriate communication path without any complicated user's operation.

BRIEF DESCRIPTION OF THE DRAWINGS

FIG. 20 is a flow chart showing a communication control procedure (analog facsimile communication) of the image communication apparatus on the reception side according to the present invention (second embodiment).

BEST MODE FOR CARRYING OUT THE INVENTION

Hereinafter, the preferred embodiments of the present invention will be explained in detail with reference to the attached drawings. In the following, the structure of an image communication apparatus is shown as an example of a communication apparatus.

[First Embodiment]

Figure 1:
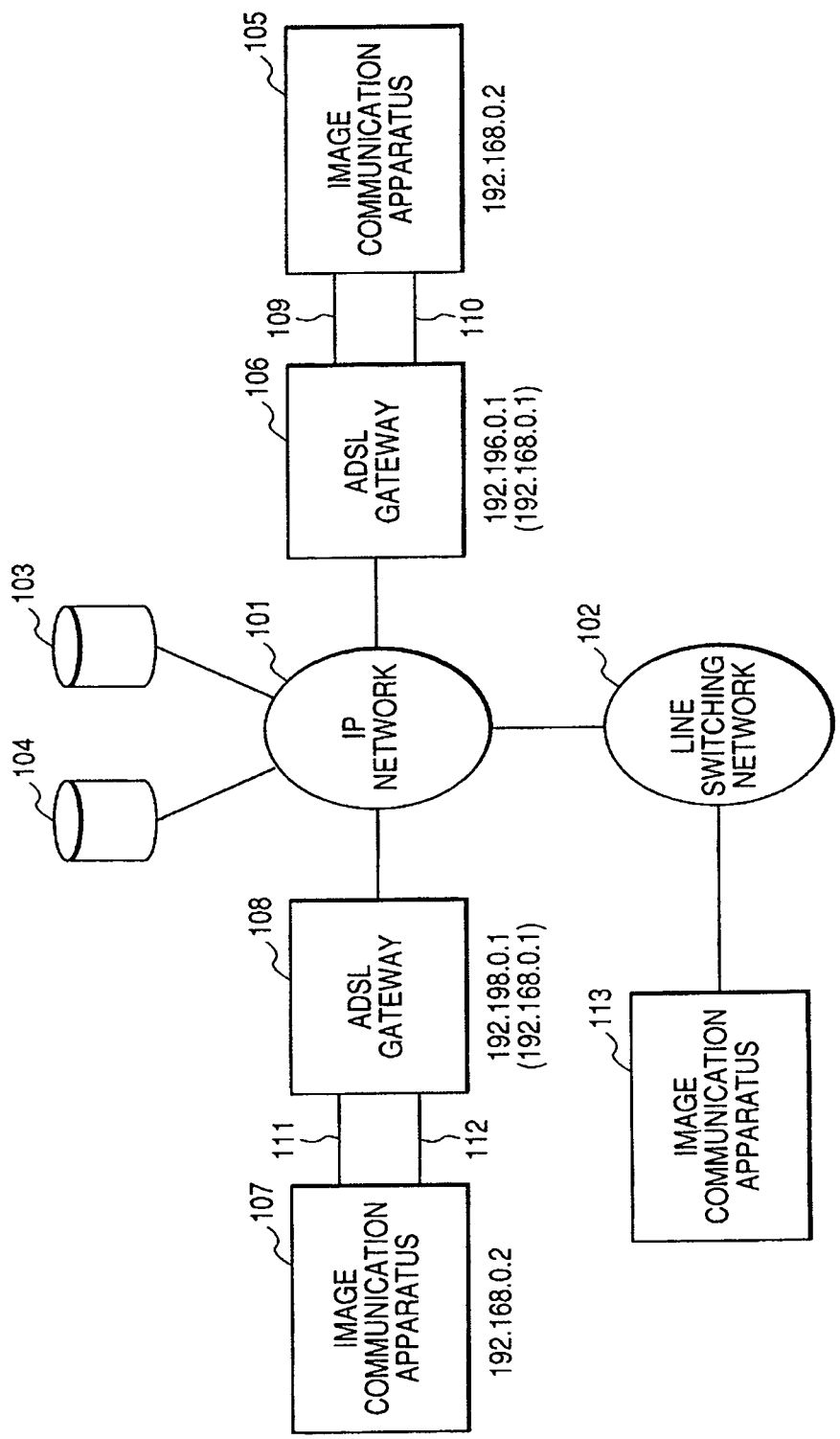
FIG. 1 is a block diagram showing the structure of a network system (first embodiment) which includes an image communication apparatus to which the present invention is applied.

FIG. 1 is a block diagram showing the structure of a network system to which the present embodiment is applicable. In FIG. 1, numeral 101 denotes an IP network, numeral 102 denotes a line switching network, numeral 103 denotes an SIP proxy (or SIP proxy server) for VoIP, numeral 104 denotes a DNS server (i.e., domain name server), numeral 105 denotes a first image communication apparatus (private IP address=192.168.0.2), numeral 106 denotes an ADSL gateway (global IP address=192.196.0.1: private IP address=192.168.0.1), numeral 107 denotes a second image communication apparatus (private IP address=192.168.0.2), and numeral 108 denotes an ADSL gateway (global IP address=192.198.0.1: private IP address=192.168.0.1). Likewise, numerals 109 and 111 denote analog telephone interfaces respectively, numerals 110 and 112 denote CSMA/CD interfaces respectively, and numeral 113 denotes a third image communication apparatus. Incidentally, although, in the following, the component parts 105, 107 and 113 are explained respectively as the image communication apparatuses which transmit/receive image data, the present embodiment is not limited to this. That is, the present embodiment is applicable even in a case where these parts are replaced with communication apparatuses which can transmit/receive data suitable for communication using the IP network.

Although the details of the structures of the ADSL gateways 106 and 108 will be explained later, these gateways close a subscriber contract of sharing both telephone communication and IP communication. In this connection, as described above, the analog telephone interface 109 and the CSMA/CD interface 110 (acting as the network interface) are provided between the ADSL gateway 106 and the image communication apparatus 105, and, likewise, the analog telephone interface 111 and the CSMA/CD interface 112 (acting as the network interface) are provided between the ADSL gateway 108 and the image communication apparatus 107. However, it should be noted that the network interface is not limited to the CSMA/CD interface.

The image communication apparatus 105 can use the analog telephone interface 109 and the CSMA/CD interface 110 between the image communication apparatus 105 and the ADSL gateway 106 respectively in various communications, and, likewise, the image Communication apparatus 107 can use the analog telephone interface 111 and the CSMA/CD interface 112 between the image communication apparatus 107 and the ADSL gateway 108 respectively in various communications.

The analog telephone interfaces 109 and 111 can be used in telephone call and analog facsimile communication based on ITU-T Recommendation T.30.

Moreover, a predetermined protocol such as PPPoE (Point to Point Protocol on Ethernet™) or the like is used on the paths of the CSMA/CD interfaces 110 and 112, whereby connection to ISP (Internet Service Provider) is established, and the global IP address on the WAN (wide area network) side and the private IP address on the LAN (local area network) side are determined. In such a situation, the image communication apparatuses 105 and 107 can use arbitrary services (e.g., services on TCP(UDP)/IP (Transmission Control Protocol (User Datagram Protocol)/Internet Protocol), such as FTP, HTTP, VoIP, etc.) on the IP network 101.

In the present invention, VoIP based on ITU-T Recommendation H.323 and SIP (Session Initiation Protocol) are partially used on the IP network 101 so that the image communication apparatuses 105 and 107 in the example of FIG. 1 are connected and thus high-speed communication is achieved. Here, it should be noted that the details of VoIP and SIP will be described later.

Figure 2:
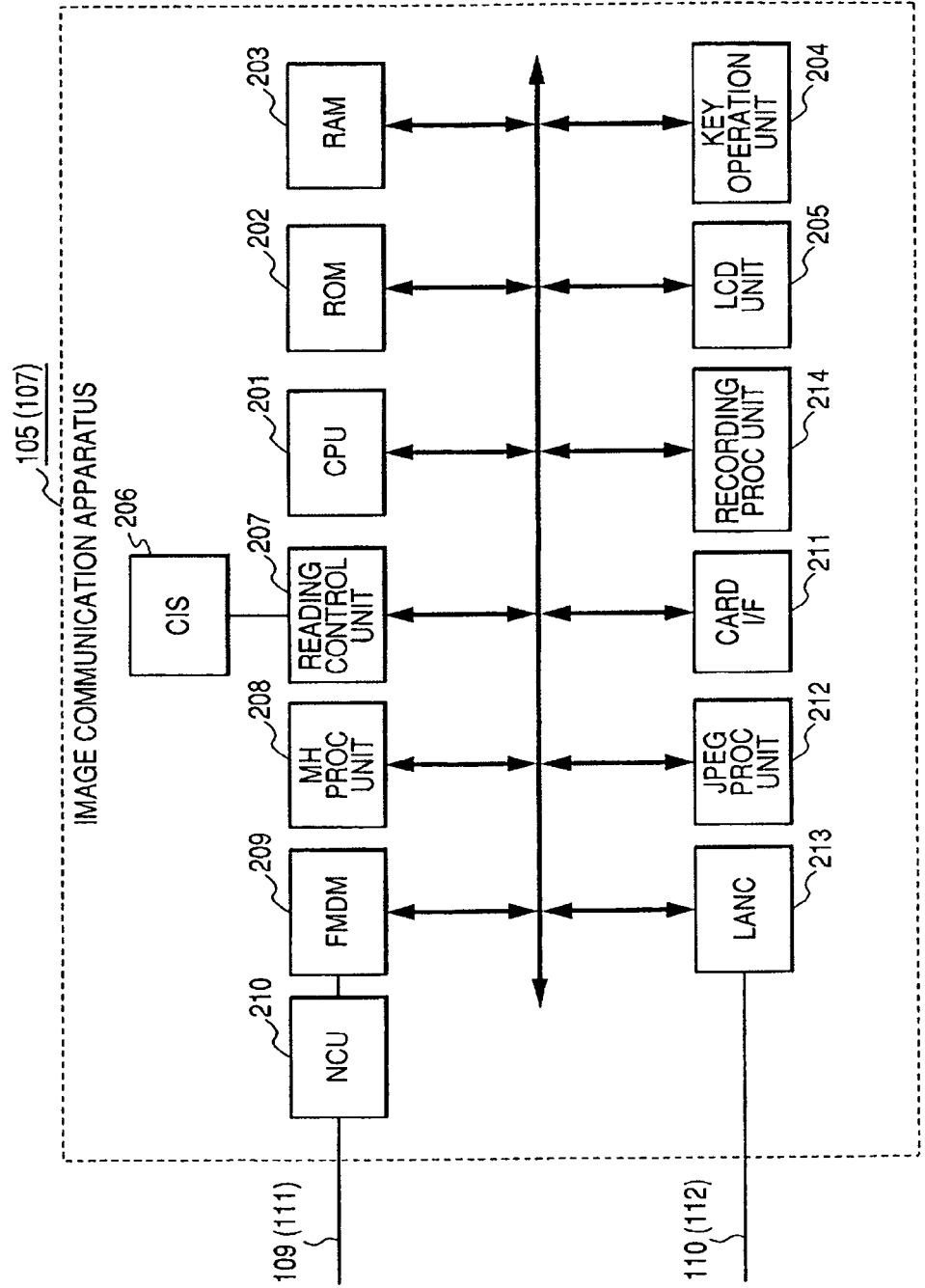
FIG. 2 is a block diagram showing the internal structure of the image communication apparatus of FIG. 1.

FIG. 2 is a block diagram showing the internal structure of the image communication apparatus 105 or 107 of FIG. 1 to which the present invention is applied. In FIG. 2, numeral 201 denotes a CPU which entirely controls the image communication apparatus according to a program stored in a ROM 202. The CPU 201 also performs a protocol process of TCP/IP so that the image data is incorporated into a TCP/IP frame. Numeral 203 denotes a RAM which is used as a working memory when the program is executed, and also used in buffering of the image data to be transmitted/received.

Numeral 204 denotes a key operation unit which consists of dials, keys, operation buttons for facsimile transmission/reception, and the like, and numeral 205 denotes an LCD (liquid crystal display) unit.

Numeral 206 denotes a CIS (contact image sensor) which converts an original image into analog signals, and numeral 207 denotes a reading control unit which converts the analog signal obtained from the CIS 206 into digital data. The digital data obtained by the reading control unit 207 is transferred to the RAM 203 under the control of the CPU 201.

Numeral 208 denotes an MH (Modified Huffman) processing unit which compresses the read image data through MH encoding when the read image data is transmitted, and decodes MH encoded image data when the encoded image data is received. Here, it should be noted that the MH processing unit 208 is also called an MH encoding/decoding unit.

Numeral 209 denotes an FMDM (facsimile modem). When the image is transmitted, the FMDM 209 modulates the MH encoded image data and outputs the analog signal having a voice band capable of being transmitted in an analog line. On the contrary, when the image is received, the FMDM 209 demodulates the received analog signal and outputs the MH encoded image data.

Numeral 210 denotes an NCU (network control unit) which has an interface function for the analog communication line.

Numeral 211 denotes a card I/F (interface). A memory card on which a JPEG image taken by a digital camera has been stored can be connected to the card I/F 211. Although the standard of the memory card is arbitrarily determined, for example, a PCMCIA (Personal Computer Memory Card International Association) card standard may be used. Moreover, the data to be stored on the memory card is not limited to images, that is, data to be processed by a computer may be stored on the memory card.

Numeral 212 denotes a JPEG processing unit which encodes (compresses) an another-format image input through the card I/F 211 into a JPEG image, and decodes (extracts) a received JPEG image.

Numeral 213 denotes an LANC (LAN controller) which transmits/receives the data to/from the ADSL gateway based on a CSMA/CD protocol.

Numeral 214 denotes a recording processing unit which converts the received image data into print raster data and then actually performs printing based on the obtained print raster data. Here, it should be noted that a recording method for the recording processing unit 214 is arbitrarily set, whereby a photoelectric recording method and an inkjet recording method may be used.

Figure 3:
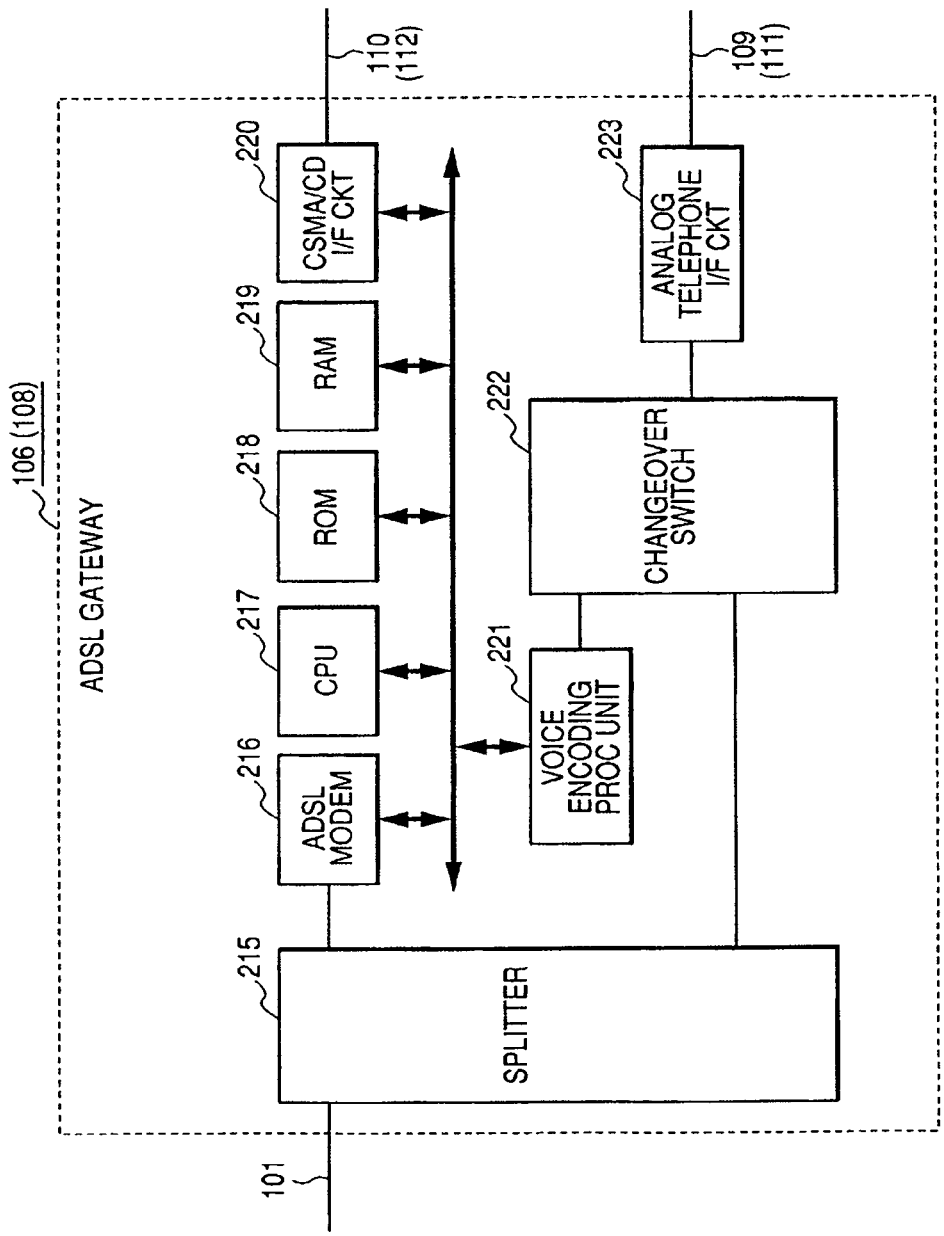
FIG. 3 is a block diagram showing the internal structure of an ADSL gateway of FIG. 1.

FIG. 3 is a block diagram showing the internal structure of the ADSL gateway 106 or 108 of FIG. 1. In FIG. 3, numeral 215 denotes a splitter which is connected to the ADSL communication line and splits the input signal into a voice-band signal and an out-of-voice-band signal, and numeral 216 denotes an ADSL modem which has a function to convert digital data into data having a signal form capable of being transmitted on ADSL.

Numeral 217 denotes a CPU which performs a process of composing and decomposing a voice/data packet input to the ADSL gateway, a communication procedure process concerning a VoIP server, and the like. Numeral 218 denotes a ROM which stores a program to operate the ADSL gateway. Numeral 219 denotes a RAM which is used to buffer the data transmitted/received by the ADSL gateway, and also used as a working memory when the program is actually executed.

Numeral 220 denotes a CSMA/CD I/F circuit which is connected to the CSMA/CD interface 110 (or 112) and performs a frame composition/decomposition process when the digital data is transmitted/received to/from the image communication apparatus.

Here, it should be noted that the ADSL gateway in the present embodiment corresponds to VoIP. That is, numeral 221 denotes a voice encoding processing unit which encodes and decodes voice data based on a voice encoding method (ITU-T Recommendation G.711, G.729 or the like) to be used in VoIP.

Numeral 222 denotes a changeover switch which changes a voice path according to whether data of a voice terminal connected to the ADSL gateway should be transmitted in the voice band or transmitted as digital data outside the voice band.

Numeral 223 denotes an analog telephone I/F circuit to which the voice terminal such as an analog telephone or the like is connected through the analog telephone interface 109 (or 111), whereby the analog telephone I/F circuit 223 can transmit/receive a voice signal to/from the voice terminal.

Next, communication controlling to be performed by the above structure will be explained. In the following, the process of transmitting the image data from the first image communication apparatus 105 to the second image communication apparatus 107 and the third image communication apparatus 113 will be explained. Here, it is assumed that JPEG image data taken by a digital camera is transmitted to the second image communication apparatus 107 and image data read by a scanner is transmitted as G3 facsimile data (HM encoded image) to the third image communication apparatus 113.

Figure 7:
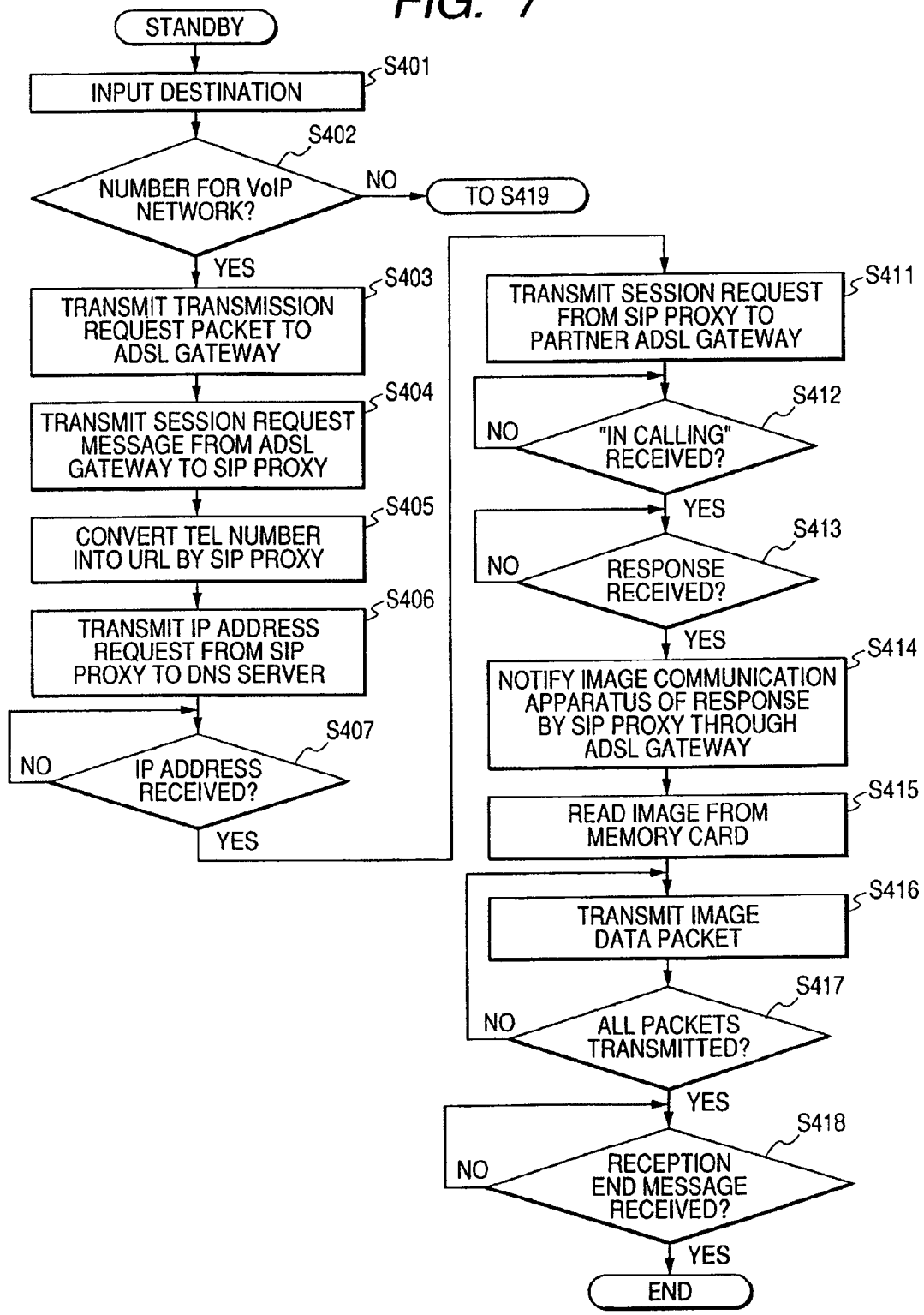
FIG. 7 is a flow chart showing an image transmission procedure (IP communication) according to the present invention (first embodiment)
Figure 8:
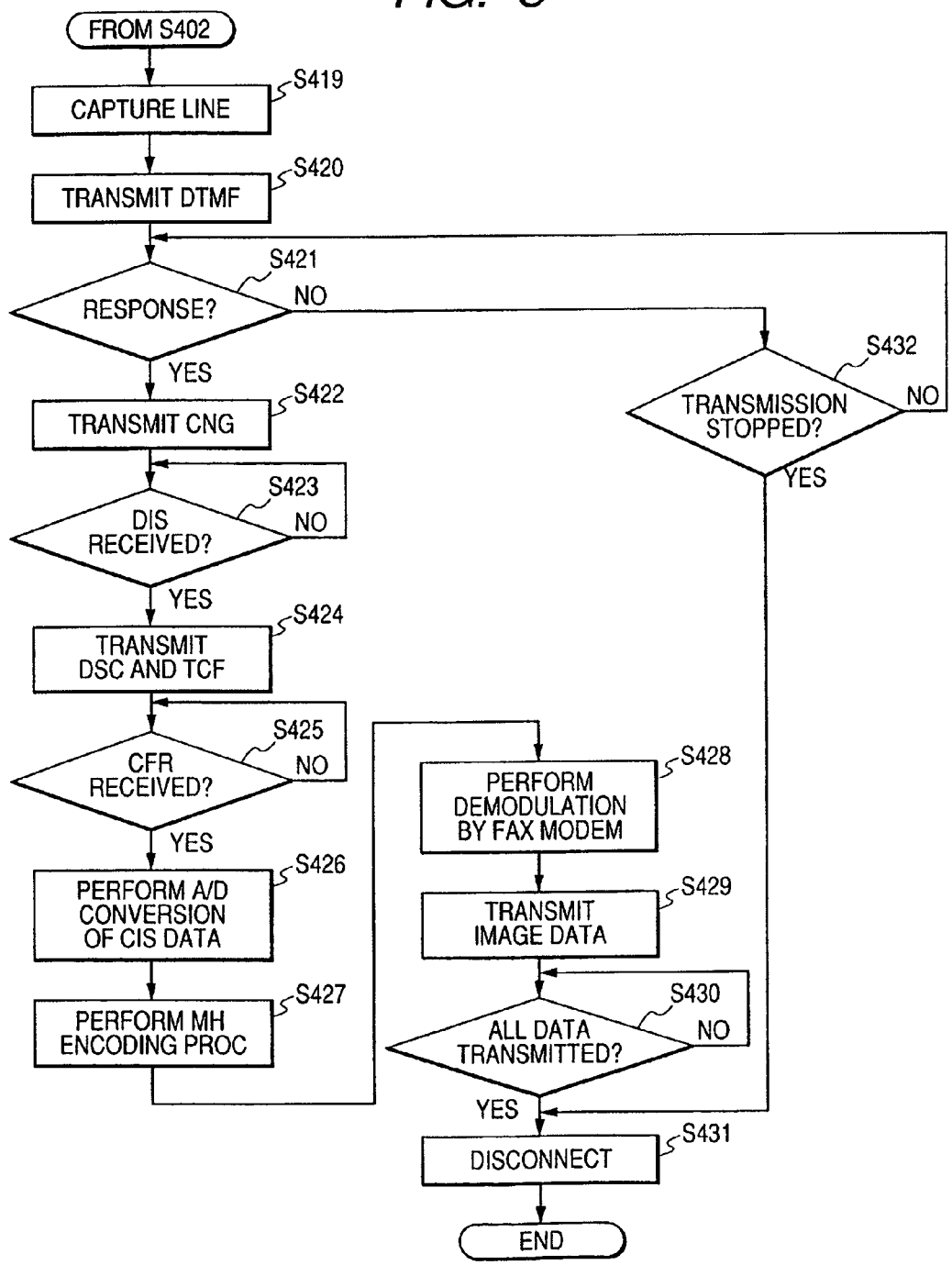
FIG. 8 is a flow chart showing an image transmission procedure (analog communication) according to the present invention (first embodiment)
Figure 9:
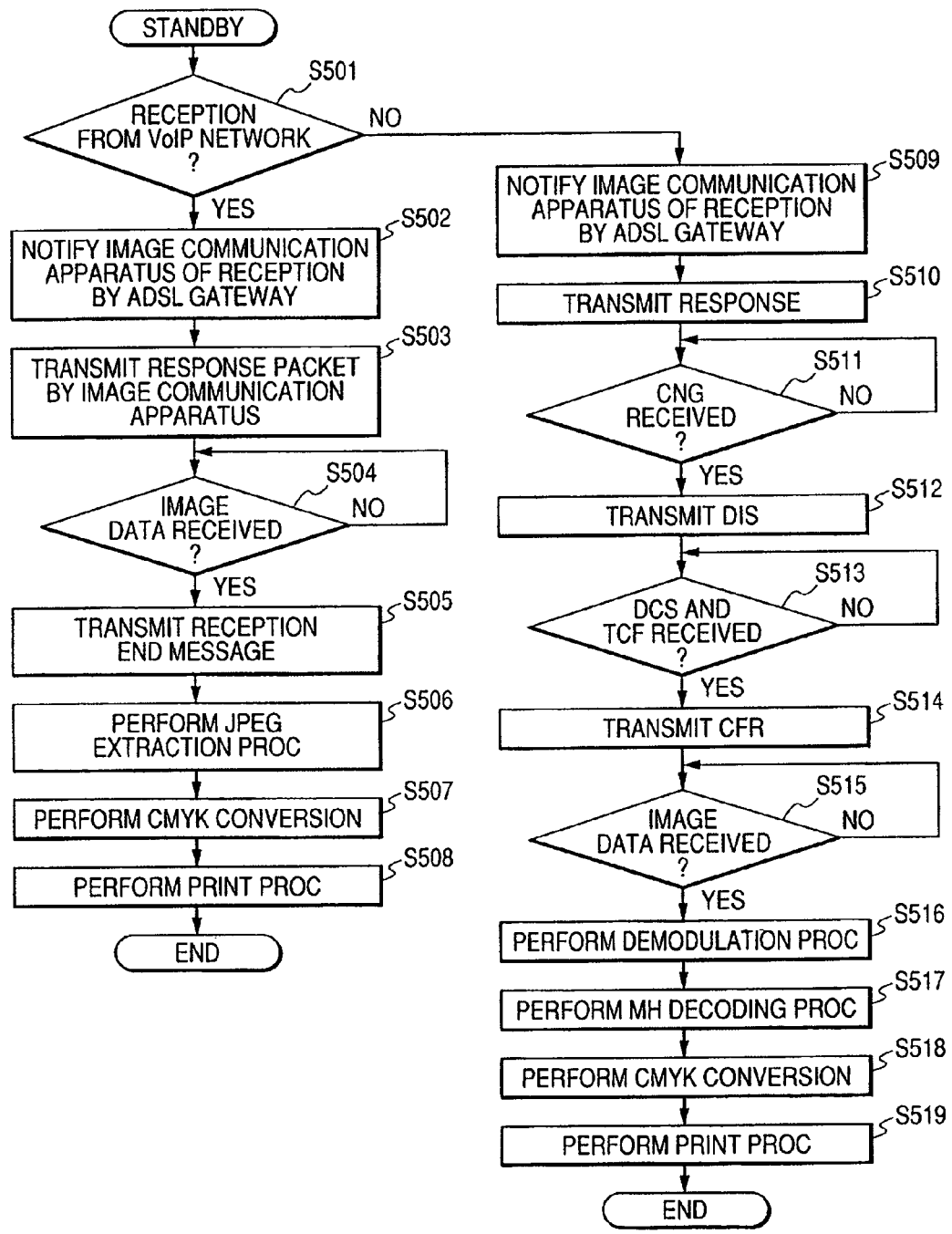
FIG. 9 is a flow chart showing an image reception procedure (IP communication and analog communication) according to the present invention (first embodiment)

FIGS. 7 to 9 are flow charts respectively showing communication control procedures to be executed by the image communication apparatus 105 or 107. Here, it should be noted that the communication control procedures shown in FIGS. 7 to 9 are stored as computer-executable control programs of the Central Processing Unit (CPU) 201 in the ROM 202, and the stored computer-executable programs are actually executed by the CPU 201. However, the location where the computer-executable program for achieving the communication control procedure according to the present embodiment is not limited to the ROM. Moreover, the present embodiment is not limited to the case where the program has been stored in the ROM from the beginning, that is, the computer-executable program may be supplied and updated through another computer-readable storage medium or via a network.

Figure 5:
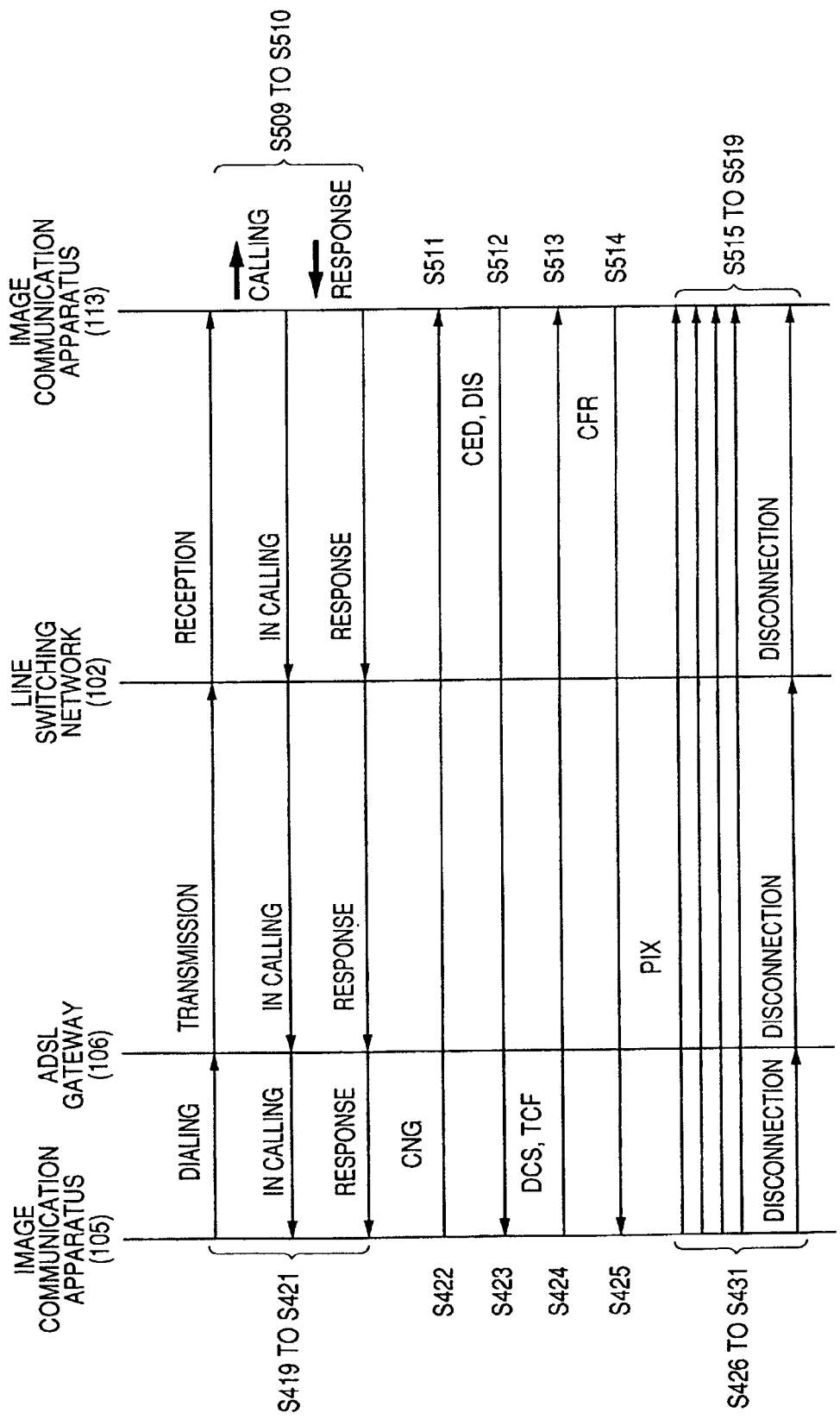
FIG. 5 is a diagram for explaining a communication sequence to transmit image data in analog communication using a voice band.
Figure 6:
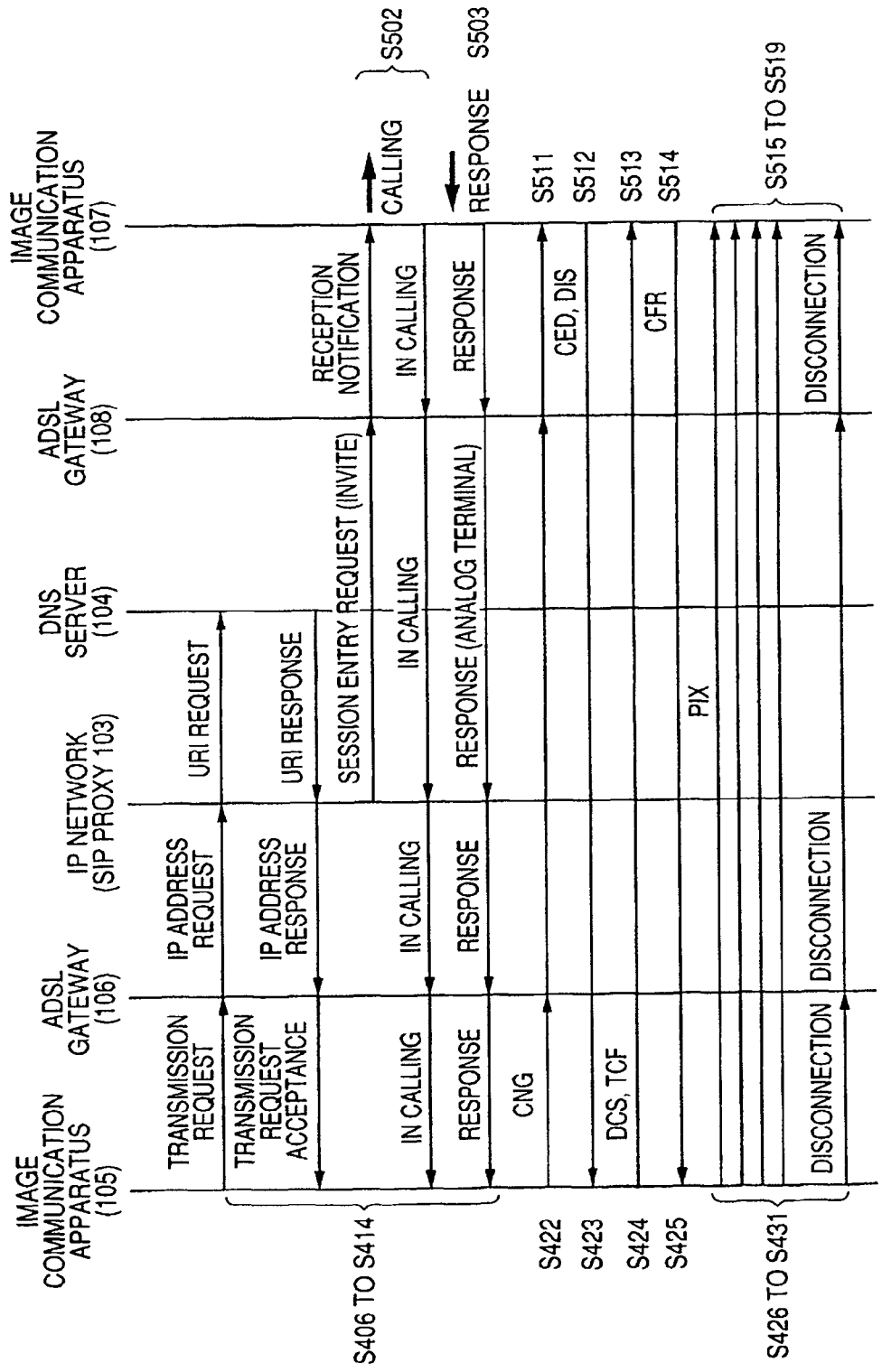
FIG. 6 is a diagram for explaining a communication sequence in a case where a communication partner can perform only the analog communication using the voice band, in the structure shown in FIG. 1.

Here, FIGS. 7 and 8 shows the communication control procedures of the image communication apparatus on a transmission side, and FIG. 9 shows the communication control procedure of the image communication apparatus on a reception side. Besides, FIGS. 4 to 6 are diagrams which respectively show communication sequences achieved by the communication controlling shown in FIGS. 7 to 9, and include step numbers respectively corresponding to the steps shown in FIGS. 7 to 9.

When a destination number is input by the key operation unit 204 of the image communication apparatus (step S401 in FIG. 7), the input destination number is analyzed to judge whether or not the communication to the destination is performed through a VoIP network. For example, when the destination number is "050-1234-5678", it is judged based on the forehand three figures (prefix) "050" that the communication is performed to the destination (communication partner) which can perform communication through the VoIP network (step S402), and the flow advances to a step S403. Here, it should be noted that the prefix "050" is currently determined in Japan as the number of a telecommunications provider of IP communication using the VoIP network. However, it is needless to say that such a prefix may be appropriately changed if a destination number in, e.g., a foreign country is applied. On the other hand, when it is judged that the communication to the destination is not performed through the VoIP network, the flow advances to a later-described step S419 in FIG. 8. Incidentally, although the above judgment is based on the prefix of the forehand three figures in the present embodiment, the present invention is not limited to this. That is, it is possible based on a table of an adequate judgment condition to judge whether or not a communication partner can communication through the VoIP network, every time the telephone number of the communication partner is input.

Figure 4:
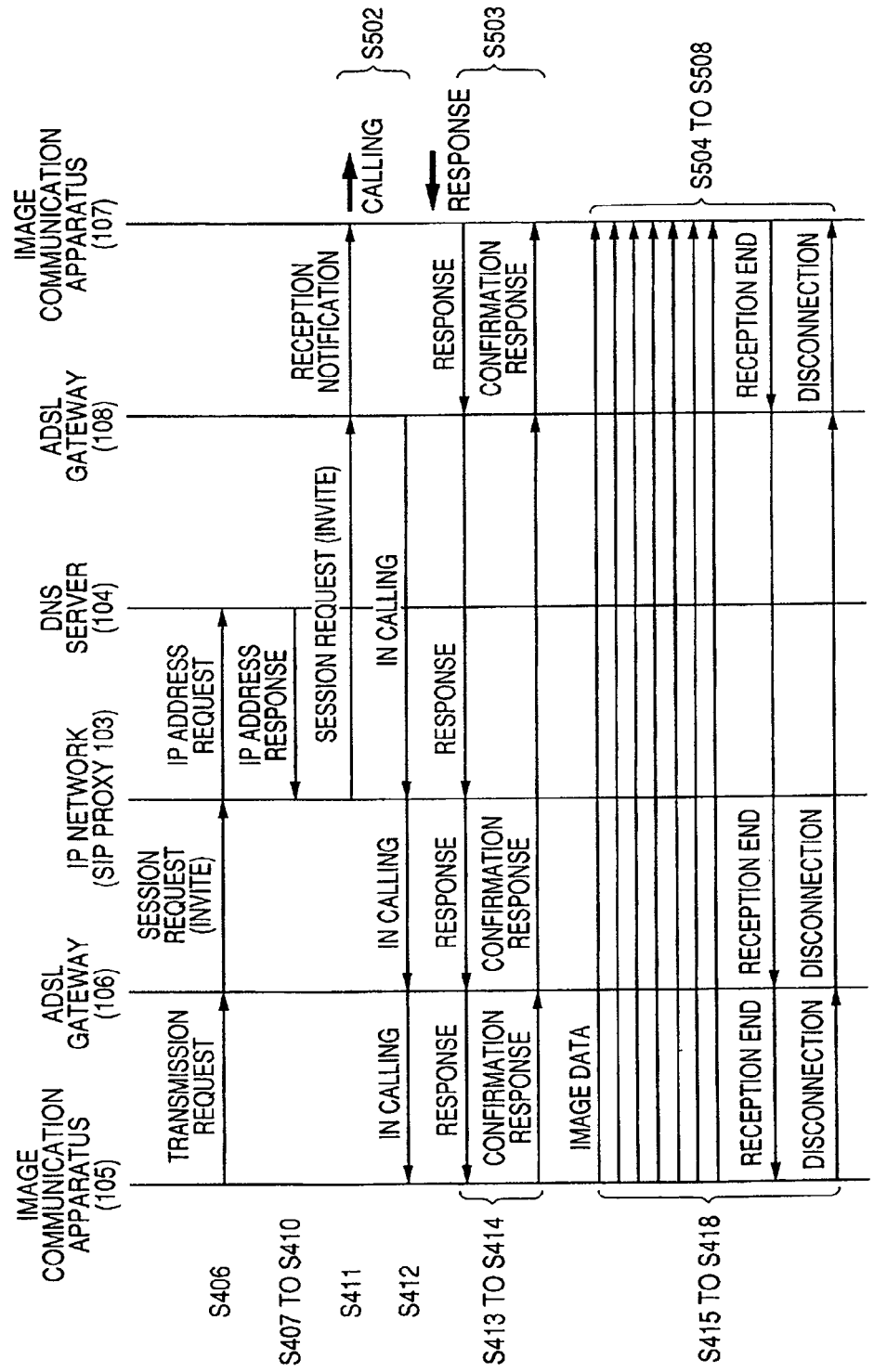
FIG. 4 is a diagram for explaining a communication sequence to transmit image data in IP (Internet Protocol) communication by using VoIP/SIP (Voice over Internet Protocol/Session Initiation Protocol), in the structure of FIG. 1.

Here, when the destination corresponds to the communication partner which can communicate through the VoIP network, the image communication apparatus 105 and the image communication apparatus 107 communicate with each other on the IP network by partially using VoIP/SIP, according to a communication sequence shown in FIG. 4. Incidentally, FIG. 5 is the diagram for explaining a communication sequence to transmit image data through the line switching network (or the VoIP network), and FIG. 6 is the diagram for explaining a communication sequence in a case where image communication is performed by transmitting/receiving an analog signal on the VoIP network.

Then, in the step S403 of FIG. 7, the image communication apparatus 105 transfers a transmission request packet including the telephone number information to the ADSL gateway 106 through the CSMA/CD interface 110. In that case, the private IP address "192.168.0.1" of the ADSL gateway 106 is set as a transmission destination address of the transmission request packet.

The ADSL gateway 106 which received the transmission request packet transmits a session request message (INVITE) to the SIP proxy 103 of the VoIP service provider (step S404). Here, it should be noted that the telephone number of the image communication apparatus 105 on the transmission source side and the telephone number of the image communication apparatus 107 on the communication partner (destination) side are included in the header of the session request message.

The SIP proxy 103 extracts the telephone number of the image communication apparatus 107 included in the session request message into URL (Uniform Resource Locater) such as "8.7.6.5.4.3.2.1.e164.arpa" (step S405), and then searches the DNS server 104 (step S406).

Then, the SIP proxy 103 receives the IP address of the communication partner's ADSL gateway 108 from the DNS server 104 (step S407), and transmits the session request message of SIP to the ADSL gateway 108 by using the received IP address (step S411). Subsequently, the ADSL gateway 108 receives the session request message (step S501 in FIG. 9), and transmits a reception message to the image communication apparatus 107 (step S502 in FIG. 9). At that time, the ADSL gateway 108 transmits an "in calling" (calling is being performed) message to the SIP proxy 103. The telephone number of the image communication apparatus 105 on the transmission source side is stored in the header of the "in calling" message. Then, the SIP proxy 103 transmits the received "in calling" message to the ADSL gateway 106 (step S412).

When the image communication apparatus 107 which received the reception message is in a receivable state, the image communication apparatus 107 transmits a response message to the ADSL gateway 108 (step S503 in FIG. 9). Then, the ADSL gateway 108 transmits the received response message to the SIP proxy 103, and the SIP proxy 103 further transmits the received response message to the ADSL gateway 106 (step S413 in FIG. 7, and step S503 in FIG. 9). At that time, the IP address of the transmission source of the response message received by the SIP proxy 103 is the ADSL gateway 108, and the IP address of the transmission destination is the SIP proxy 103. Thus, the SIP proxy 103 does not change the IP address of the transmission source as the ADSL gateway 108, but changes only the IP address of the transmission destination to the ADSL gateway 106. After then, the SIP proxy 103 transmits the response message to the ADSL gateway 106, whereby the response message is further transmitted from the ADSL gateway 106 to the image communication apparatus 105 (step S414). Here, it should be noted that the response message in question includes the IP address and port number information of the communication partner's ADSL gateway 108.

Such a calling process as mentioned above is performed by using the protocol (VoIP) of an IP telephone which performs voice packet communication. Here, in the voice communication based on VoIP, UDP (User Datagram Protocol) is generally used because real-time ability is valued more than data reliability. After then, because it is assumed that the voice communication is performed based on the protocol (VoIP) of the IP telephone, UDP suitable for the voice packet communication is thus used continuously.

By the process in the steps S401 to S414 and the upper half sequence shown in FIG. 4, the image communication apparatus 105 can be connected to the image communication apparatus 107 by means of a socket API (Application Programming Interface) corresponding to a predetermined port number on TCP(UDP)/IP, whereby data transmission/reception can be started between the image communication apparatuses 105 and 107.

In the image communication apparatus 105, the image data is composed to the TCP/IP frame (packet) to be transmitted, and the IP address of the ADSL gateway 108 is added to the transmission destination address. In any case, the TCP/IP packet is transmitted to the ADSL gateway 108 through the ADSL gateway 106 and the IP network 101, and the transmission destination address thereof is converted into the private IP address of the image communication apparatus 107 by the ADSL gateway 108. Subsequently, the TCP/IP packet is transmitted to the image communication apparatus 107 through the CSMA/CD interface 112.

At that time, it should be noted that an arbitrary protocol can be used as a file transfer protocol corresponding to the upper layer of TCP/IP used in transmitting the image data. More specifically, generally used FTP (File Transfer Protocol), HTTP (HyperText Transfer Protocol), methods obtained by applying these protocols (that is, a dedicated method, an encrypted version of FTP or HTTP, IPP (Internet Printing Protocol) or IPP FAX based on HTTP defined by IEEE (Institute of Electrical and Electronics Engineers), etc.), and the like can be used.

Before the image data is transmitted, the image communication apparatus 105 transmits an image transmission request message to the image communication apparatus 107. Then, when an image transmission permission message is received from the image communication apparatus 107, the image communication apparatus 105 initiates the file transfer protocol and starts the image transmission process.

When it is determined to perform the image communication, it is preferable to perform the subsequent image transmission process after changing UDP which values the packet data real-time ability to TCP which values the packet data reliability and the TCP enable port number. In this connection, it should be noted that UDP may be changed to TCP when the image transmission permission message is received from the image communication apparatus 107 and thus the image communication is determined or after the response message was transmitted to the image communication apparatus 105 in the step S414. As above, when it intends to transmit the image (data), because the image transmission request message is transmitted prior to the actual image data transmission, it is possible with precision to notify the communication partner whether the transmission source wishes telephone call or image communication, whereby it is possible to select the protocol suitable for voice communication or the protocol suitable for image communication.

Subsequently, in the image communication apparatus 105, the CPU 201 reads the JPEG image data stored in the memory card through the card I/F 211 (step S415), and transfers the read image data to the LANC 213. Then, the LANC 213 generates a data packet with respect to each certain amount of data, adds the previously received global IP address "192.198.0.1" of the communication partner's ADSL gateway 108 to the header thereof as the transmission destination, and actually transmits the obtained data packet (step S416).

When the image data (packet) is received, the ADSL gateway 108 converts the IP address as described above, and then transfers the image data to the image communication apparatus 107. When the image data is received, the image communication apparatus 107 causes the LANC 213 to delete the header, and stores the obtained JPEG image data in the RAM 203 (step S504 in FIG. 9).

When all the JPEG image data are transmitted from the image communication apparatus 105 to the image communication apparatus 107 (step S417 in FIG. 7), the image communication apparatus 107 transmits a reception end message to the image communication apparatus 105 (step S505 in FIG. 9), whereby the image transmission ends (step S418,).

In the image communication apparatus 107, the received JPEG image data is extracted by the JPEG processing unit 212 (step S506 in FIG. 9), the extracted data is further converted into C, M, Y, K four-color data (step S507), and the color data are printed and output by a not-shown printer unit (step S508).

Thus, it is possible by the above procedure to achieve high-speed image transmission. Here, when it is assumed that the data size of a JPEG image taken by a digital camera is 300 KB and upload transmission speed of the ADSL is 1 Mbps, a time necessary for the data transmission is about 300K÷(1000K÷8)=2.4 seconds at most.

In the present embodiment, it is though that the image of JPEG format is transmitted between the image communication apparatuses 105 and 107. However, it is needless to say that an image file of G3 format or TIFF (Tagged Image File Format)/G3 format (or even non-image data) can be of course transmitted under the communication control substantially the same as the above. When the image of G3 format is transmitted, the transmission speed on an analog communication path is only about 56 Kbps maximally. Moreover, it is expected that the effective speed further decreases due to execution of the protocol based on ITU-T Recommendation T.30. For these reasons, the transmission speed in the facsimile communication can be remarkably improved if the above communication procedure is applied to the image transmission of G3 format. Incidentally, when the image data of G3 format (or data of another format) is received, it is needless to say that the process in the steps S505 to S503 to be performed on the data reception side is of course changed. That is, in that case, the image data of G3 format (or another format) is decoded (step S506), a process such as a color conversion process or the like is performed to the decoded data if necessary (step S507), and the processed data is reproduced (step S508).

In the meantime, when it is judged in the step S402 that the communication based on the destination's telephone number is not performed through the VoIP network, the telephone number in question is considered to correspond to the communication partner of which the telephone number is, e.g., "03-1234-5678" and which performs communication through the line switching network based on the prefix of its forehand two figures "03". Therefore, the line of the analog telephone interface 109 of the ADSL gateway 106 is captured (step S419), and a DTMF (Dial Tone Multi Frequency) signal corresponding to the telephone number is transmitted to the ADSL gateway 106 through the analog telephone interface 109 (step S420). Then, the ADSL gateway 106 transmits the DTMF signal corresponding to the destination's telephone number onto a voice band channel, and the DTMF signal is connected to the line switching network 102 through a gateway (not shown) of the VoIP service provider. Besides, it should be noted that the following process is likewise applied when the DTMF signal is directly connected from the ADSL gateway 106 to the line switching network 102.

When the DTMF signal is connected to the line switching network 102, the same facsimile communication as in the conventional communication based on ITU-T Recommendation T.30 is performed according to the communication sequence shown in FIG. 5. More specifically, the reception notification is first transmitted to the image communication apparatus 113 being the communication partner side terminal. Then, when the response is received from the image communication apparatus 113 (step S421), the ADSL gateway 106 inverts the polarity of the analog signal interface connected to the image communication apparatus 105 to notify it that the response was received, and thereafter starts the facsimile communication based on ITU-T Recommendation T.30.

Subsequently, the image communication apparatus 105 outputs a CNG (calling tone) signal (step S422), the image communication apparatus 113 which received the CNG signal outputs a DIS (digital identification signal), the image communication apparatus 105 which received the DIS further outputs a DCS (digital command signal) and a TCF (training check) (steps S423 and S424), and the image communication apparatus 113 which received the DCS and the TCF further outputs a CFR (confirmation to receive) signal. Hereinafter, the CNG signal and the CFR signal are simply called the CNG signal and the CFR signal respectively.

When the CFR signal is received (step S425), the image communication apparatus 105 starts the image data transmission. In the image data transmission, the analog signal input from the CIS 206 is subjected to A/D conversion while an original is being moved under the control of the reading control unit 207 (step S426). Subsequently, the converted image data is subjected to the MH encoding to achieve the data compression by the MH processing unit 208 (step S427), the image data subjected to the MH encoding is input to the FMDM 209 and thus modulated into the analog signal (step S428), and the modulated signal is then transmitted to the ADSL gateway 106 through the NCU 210 (step S429). After then, a necessary end process is performed (steps S430 and S431). In the meantime, when the response is not received from the image communication apparatus 113 (step S421), it is judged whether or not the transmission is stopped (step S432), and a necessary process is performed subsequently.

In the ADSL gateway 106, the signal input through the analog telephone interface 109 is transmitted as it is to the communication line by using the voice band channel, and the signal is further transmitted to the image communication apparatus 113 through the line switching network 102. In the image communication apparatus 113 which received the image data, the received image data is demodulated by the FMDM 209 and then decoded by the MH processing unit 208, the decoded data is converted into C, M, Y, K four-color data by the recording processing unit 214, and the converted data are then printed and output by a printer unit. It should be noted that such a reception process is substantially the same as the process in and after a later-described step S509.

In the meantime, a process to be performed when the facsimile transmission is performed from the image communication apparatus 113 which does not have any means for connecting the IP network and thus can connect only to the line switching network 102 to the image communication apparatus 105 (or 107) will be explained. In that case, the image communication apparatus 105 acts as a reception-side apparatus and thus performs the process in and after the steps S501 to S509 shown in FIG. 9.

When dialing to the image communication apparatus 105 is performed in the image communication apparatus 113, the ADSL gateway 106 which received the calling notifies the image communication apparatus 105 of the calling reception through the analog telephone interface 109 (step S509 in FIG. 9). Then, when the image communication apparatus 105 outputs a response (step S510), the image communication apparatus 113 recognizes this response due to polarity inversion and thus starts the image data transmission according to the facsimile communication procedure based on ITU-T Recommendation T.30.

In the image data transmission, the image communication apparatus 113 outputs a CNG signal, the image communication apparatus 105 which received the CNG signal outputs a DIS (steps S511 and S512), the image communication apparatus 113 which received the DIS further outputs a DCS and a TCF, and the image communication apparatus 105 which received the DCS and the TCF further outputs a CFR signal (steps 5513 and S514).

When the CFR signal is received, the image communication apparatus 113 starts the image data transmission. In the image data transmission, the analog signal input from the CIS 206 is subjected to A/D conversion while an original is being moved under the control of the reading control unit 207. Subsequently, the converted image data is subjected to the MH encoding to achieve the data compression by the MH processing unit 208, the image data subjected to the MH encoding is input to the FMDM 209 and thus modulated into the analog signal, the modulated signal is transmitted to the communication line through the NCU 210, and the signal is finally transmitted to the ADSL gateway 108 through the IP network 101.

When the image data is received by the image communication apparatus 105 through the ADSL gateway 108 (step S515), the received image data is demodulated by the FMDM 209 (step S516) and then decoded by the MH processing unit 208 (step S517), the decoded data is converted into C, M, Y, K four-color data by the recording processing unit 214 (step S518), and the converted data are then printed and output by a printer unit (step S519).

As described above, according to the present embodiment, the image communication apparatus 105 can transmit/receive the image (data) at high speed to/from the image communication apparatus, having the VoIP network connection function, on the IP network without using the analog communication path. Moreover, the image communication apparatus 105 can transmit/receive the image (data) to/from the image communication apparatus, having only the conventional facsimile function, according to the facsimile communication procedure.

In the image communication on the IP network according to the present embodiment, it is possible to know the IP address and the port number of the communication partner by partially using SIP originally used in the VoIP network, and it is further possible to transmit the image data at high speed by using the specific services (HTTP, FTP, etc.) on TCP(UDP)/IP.

Moreover, the user on the transmission side can designate the communication partner side only by inputting the communication partner's telephone number. Furthermore, the user can further designate whether to perform the communication through the VoIP network only by the prefix of the telephone number, that is, another complicated designation operation is unnecessary.

In the present embodiment, when the image data is transmitted to the image communication apparatus 107 connected to the VoIP network, the image data is actually transmitted in the form of packet by using the specific services (HTTP, FTP, etc.) on TCP(UDP)/IP through the CSMA/CD interface 112. However, in many communication partner stations which have image communication apparatuses respectively and are connected to the VoIP network, there is the communication partner station of which the communication apparatus can execute only the conventional facsimile communication function. For example, it is assumed that the image communication apparatus 107 is an old-type analog facsimile machine which is connected only to the analog telephone interface 111 of the ADSL gateway 108, such an image communication apparatus which can perform communication on a VoIP communication channel can merely execute the conventional analog facsimile communication procedure.

In that case, because the image communication apparatus 105 cannot perform the image communication to the image communication apparatus 107 by using the IP communication through the CSMA/CD interface 112, the image communication apparatus 105 actually performs the facsimile image transmission by transmitting the analog facsimile signal by the VoIP communication.

FIG. 6 shows the communication sequence in that case. In FIG. 6, a transmission request by the image communication apparatus 105 is performed in the same manner as that shown in FIG. 4 (see steps S406 to S414 in FIG. 7). At that time, the ADSL gateway 108 which called the image communication apparatus 107 confirms that the image communication apparatus 107 is not connected to the CSMA/CD interface. Thus, in a response message, the ADSL gateway 108 notifies the image communication apparatus 105 that the image communication apparatus 107 is the terminal which is connected only by the analog telephone interface.

Then, after the VoIP communication channel was formed between the ADSL gateways 106 and 108, the image communication apparatus 105 performs by using the VoIP communication channel the image data transmission to the image communication apparatus 107 according to the facsimile communication procedure based on ITU-T Recommendation T.30 as in the conventional facsimile transmission.

Here, it should be noted that the analog facsimile communication based on ITU-T Recommendation T.30 is performed by transmitting the analog signal using the voice band on the VoIP communication channel. In practice, the communication apparatuses on the transmission and reception sides perform the operation quite the same as the analog facsimile transmission through the ordinary line switching network. That is, the transmission side (image communication apparatus 105) performs the image data transmission/reception operation according to the same procedure as that shown in FIG. 8, and the reception side (image communication apparatus 107) performs the image data transmission/reception operation according to the same procedure as that in and after the step S509 of FIG. 9.

Incidentally, when the protocol on the IP network cannot be used, the facsimile signal is transmitted by using a facsimile gateway as later described in the second embodiment, as well as the line switching network 102 and the VoIP communication channel described as above. Here, when the facsimile signal is transmitted on the IP network by using the facsimile gateway or the like, communication costs can be of course saved because accounting being in proportion to a communication distance can be avoided.

Moreover, in FIG. 6, it is explained that, in the response message, the ADSL gateway 108 notifies the image communication apparatus 105 that the image communication apparatus 107 is the terminal which is connected only by the analog telephone interface, and thus the image data transmission is performed according to the same facsimile communication procedure as that in the conventional facsimile transmission. However, the present invention is not limited to this, and the image transmission may be performed according to the conventional facsimile transmission procedure as follows. That is, although in the above explanation the image communication apparatus 105 transmits the image transmission request message to the image communication apparatus 107 after the reception of the response message and before the transmission of the image data, it is controlled to perform the image transmission according to the conventional facsimile transmission procedure by using the voice band when the image transmission permission message is not received from the image communication apparatus 107. By doing so, even if the communication apparatus on the communication partner side cannot understand the protocol of the present invention and thus can merely perform the conventional facsimile communication, the data communication with the communication partner side can be surely performed.

Incidentally, in the present embodiment, it is thought that, when the image data is transmitted from the image communication apparatus 105 to the image communication apparatus 107, the dialing information is notified to the ADSL gateway through the CSMA/CD interface. However, such dialing information may be notified to the ADSL gateway in the form of DTMF signal by using the analog telephone interface.

Moreover, in the present embodiment, it is supposed that the image communication apparatus (105, 107) is physically independent of the ADSL gateway (106, 108). However, the same effect as above can be obtained even when the image communication apparatus and the ADSL gateway are integrally provided. In that case, because the ADSL gateway can be connected to the image communication apparatus by using, instead of the CSMS/CD interface, a dedicated bus or the like, it is unnecessary to exchange various command between the image communication apparatus and the ADSL gateway, whereby communication efficiency can be improved.

Furthermore, in the present embodiment, the structure of the line interface portion shown as the ADSL gateway is the structure which consists of the ADSL modem and the splitter. However, in addition to the structure in question, a router or the like for sharing IP connection with another network terminal may be included. Moreover, the functions of a gate keeper for VoIP and the facsimile gateway based on ITU-T Recommendation T.38 may be included in the line interface portion shown as the ADSL gateway.

Furthermore, in the present embodiment, the ADSL service is thought as the network communication service. However, the technique in the present invention, particularly the transfer technique to use VoIP/SIP during the first half of the communication and use FRP, HTTP, etc. during the last half thereof, is not limited to ADSL. That is, if a network communication environment capable of using VoIP/SIP is provided, a network such as FTTH (Fiber To The Home), ATM (Asynchronous Transfer Mode) or the like can be likewise used. More specifically, even if the network such as FTTH, ATM or the like different from ADSL is used, it is merely necessary to change only the network interface (e.g., ADSL modem 216 in FIG. 3) on the WAN side to a network corresponding to the network in question, that is, other structures are the same as those in the present embodiment. Moreover, if it is necessary to perform a fallback (FIG. 6) for the analog communication, it only has to provide, in addition to the IP communication means, some analog communication means between the line interface (e.g., ADSL gateway) and the image communication means (e.g., image communication apparatus).

Furthermore, in the present embodiment, the image data is transmitted from the calling side. However, it is needless to say that the control procedure according to the present invention can be used even in a case where the image data transmission direction is opposite to that in the present embodiment, that is, palling transmission/reception is performed. Particularly, when the IP communication is performed during the last half of the communication operation, such communication can be easily achieved by using a file transmission/reception protocol such as FTP for supporting bi-directional data transmission. Moreover, when the analog communication path is used, it only has to perform ordinary polling communication defined based on ITU-T Recommendation T.30.

[Second Embodiment]

In the above-described first embodiment, the structure that the NCU 210 acting as the interface for the line switching network is provided in the image communication apparatus is explained by way of example. In the meantime, in the second embodiment, the structure that the NCU 210 is not used as the interface for the line switching network will be explained by way of example.

In the present embodiment, to a communication partner's image communication apparatus capable of using an IP protocol, image data is transmitted, without using the facsimile protocol as in the first embodiment, by using a data transmission/reception protocol on the IP network. Moreover, to a communication partner's image communication apparatus incapable of using the IP protocol (e.g., an image communication apparatus not connected to the VoIP network but connected only to the general line switching network), image data transmission is performed by transmitting a facsimile signal as a voice signal through the facsimile gateway.

In the present embodiment, it should be noted that the parts same as or corresponding to those in the first embodiment are denoted by the same reference numerals and symbols respectively, and the detailed explanation of these parts will be properly omitted.

Figure 10:
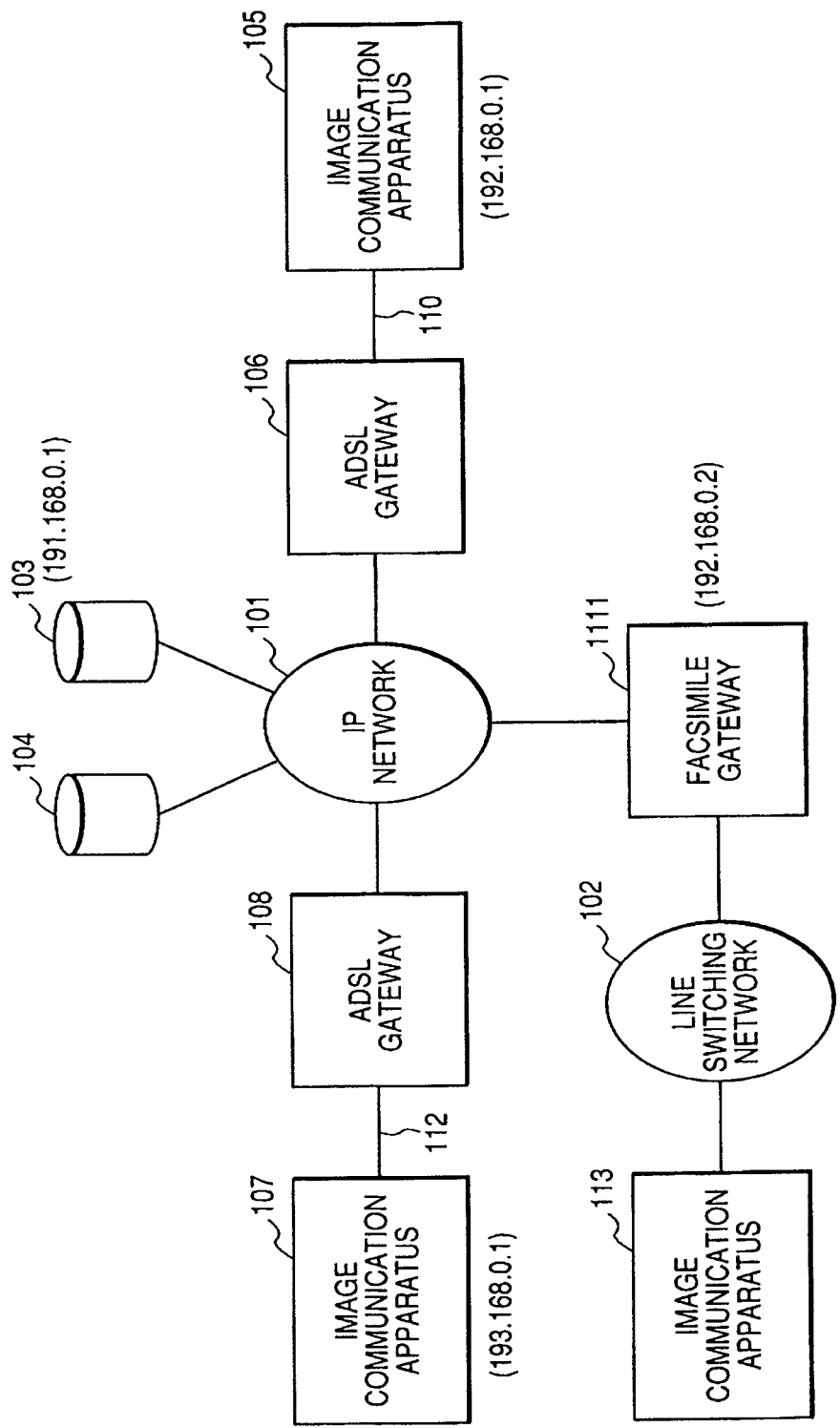
FIG. 10 is a block diagram showing the structure of a network system (second embodiment) which includes an image communication apparatus to which the present invention is applied.

FIG. 10 is a block diagram showing the structure of a network system to which the present embodiment is applicable. Here, it should be noted that FIG. 10 corresponds to FIG. 1 in the first embodiment.

In FIG. 10, the point different from FIG. 1 is that a facsimile gateway 1111 is provided to perform communication with a conventional image communication apparatus 113 connected to (only) a line switching network 102.

Moreover, in FIG. 10, for ease of explanation, only global addresses are shown as IP addresses of respective terminals, that is, the global addresses are allocated as follows.

SIP proxy 103 for VoIP: 191.168.0.1
image communication apparatus 105: 192.168.0.1
image communication apparatus 107: 193.168.0.1
facsimile gateway 1111: 192.168.0.2

Here, it should be noted that the facsimile gateway 1111 connects an IP network 101 with the (telephone) line switching network 102, and performs data conversion process with respect to the image communication apparatus 113 such as a facsimile machine or the like connected only to the general line switching network 102. Moreover, it should be noted that the facsimile gateway 1111 is provided by an Internet service provider.

In the present embodiment, it is assumed that the facsimile gateway 1111 consists of an A/D and D/A conversion means similar to (or different in form from) a VoIP codec 1210 (FIG. 11), an interface means (at least, NCU, facsimile modem, or the like) for the line switching network 102, and a connection means (e.g., CSMA/CD interface or the like) to the Internet side.

Here, it should be noted that an arbitrary protocol can be used as the communication protocol of the facsimile gateway 1111. More specifically, the image communication apparatus 105 on the transmission side causes the VoIP codec 1210 to convert an analog facsimile signal into a digital signal, and transmits the obtained digital signal to the facsimile gateway 1111. Then, the facsimile gateway 1111 causes the hardware similar to the VoIP codec 1210 to convert the received digital signal into the analog facsimile signal, and transmits the obtained analog facsimile signal to the image communication apparatus 113 through the line switching network 102. Moreover, it should be noted that an Internet facsimile protocol based on ITU-T Recommendation T.38 or the like can be used for the facsimile gateway 1111.

Figure 11:
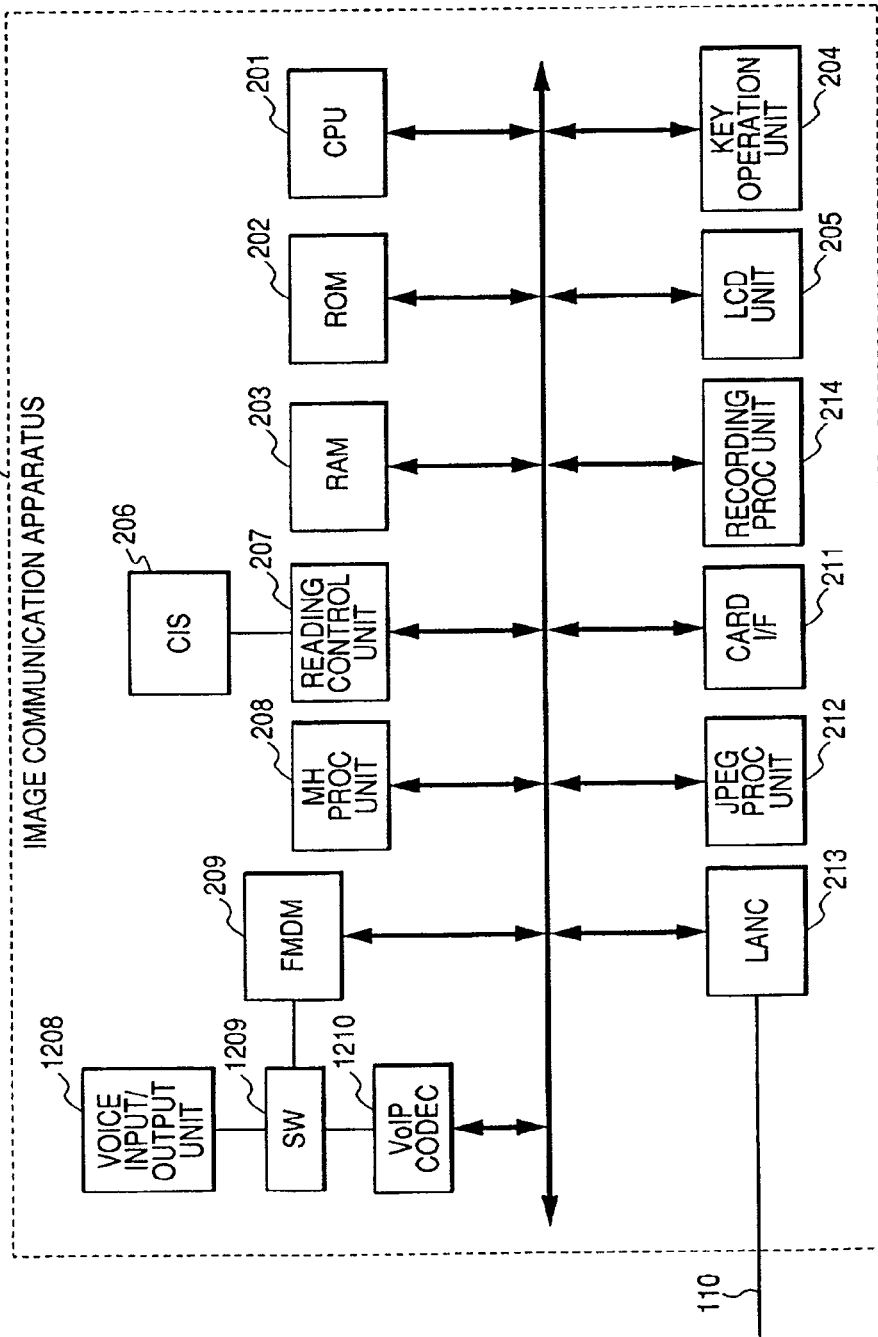
FIG. 11 is a block diagram showing the internal structure of the image communication apparatus of FIG. 10.

FIG. 11 is the block diagram showing the internal structure of the image communication apparatus 105 or 107 of FIG. 10 according to the present embodiment. Here, it should be noted that FIG. 11 corresponds to FIG. 2 in the first embodiment. In FIG. 11, the point different from FIG. 2 is that a structure for the analog telephone interface 109 of FIG. 2 is not provided.

For this reason, a voice input/output unit (handset) 1208, an analog switch 1209 and a VoIP codec 1210 are provided in FIG. 11.

In FIG. 11, the voice input/output unit 1208 consists of a microphone for inputting voice, a speaker for outputting voice, an amplifier for amplifying input and output signals respectively corresponding to the input and output voices, and the like.

The analog switch 1209 changes the input and output signals for the VoIP codec 1210. More specifically, the analog switch 1209 is controlled by a CPU 201 to connect the VoIP codec 1210 to an FMDM (facsimile modem) 209 in facsimile image communication, and on one hand connect the VoIP codec 1210 to the voice input/output unit 1208 in telephone calling.

Thus, in the present embodiment, a telephone call voice signal (analog signal) of the voice input/output unit 1208 or a facsimile signal (analog signal) of the FMDM 209 is transmitted and received only based on VoIP only through an LANC (LAN controller) 213. In such an operation, it should be noted that the analog signal is transmitted and received without using analog interface.

Moreover, in the present embodiment, it is possible for ADSL gateways 106 and 108 of FIG. 10 to use the same structure as that shown in FIG. 3. However, in the present embodiment, an analog telephone interface (109 in FIG. 3) is not used.

Hereinafter, a process of transmitting an image (image data) from the first image communication apparatus 105 to the second image communication apparatus 107 and the third image communication apparatus 113 will be explained.

Here, in the present embodiment, it is assumed that JPEG image data taken by a digital camera is transmitted to the second image communication apparatus 107 and image data read by a scanner is MH encoded and transmitted to the third image communication apparatus 113.

Figure 12:
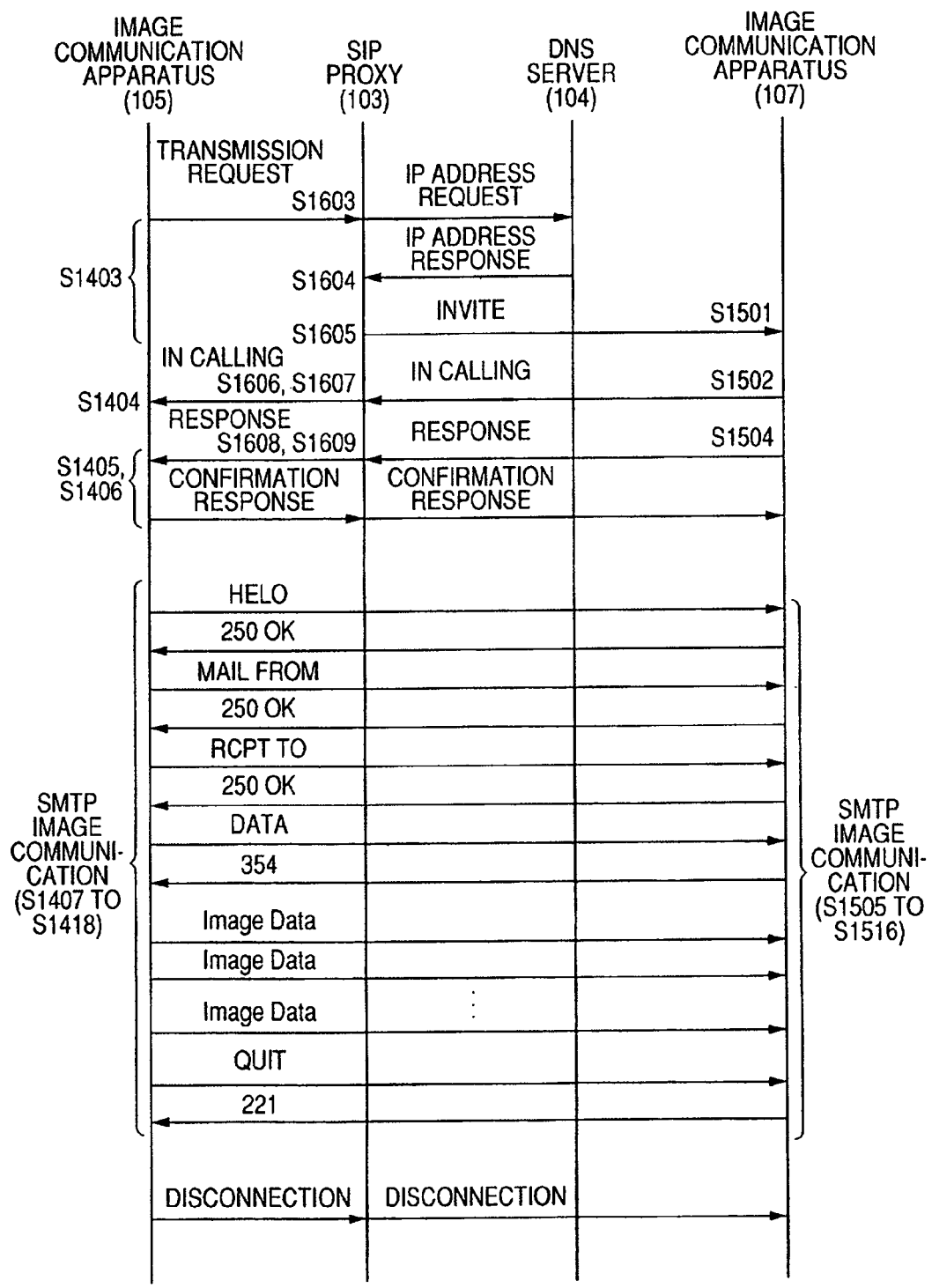
FIG. 12 is a diagram for explaining a communication sequence to transmit image data in IP communication (SMTP (Simple Mail Transfer Protocol)) by using VoIP/SIP, in the structure of FIG. 10.
Figure 13:
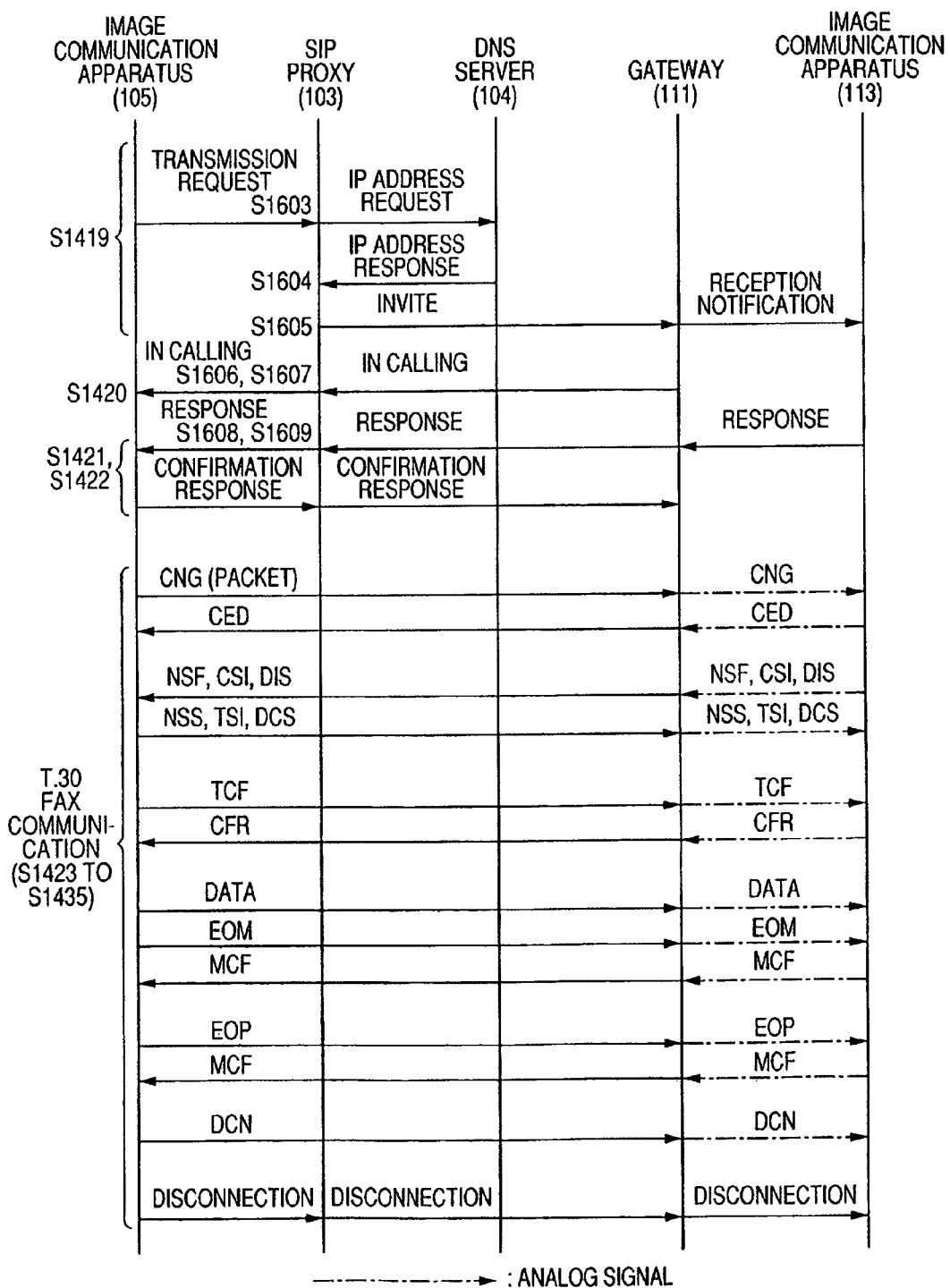
FIG. 13 is a diagram for explaining a communication sequence to transmit an image (analog facsimile signal) to a communication partner station connected to a line switching network, in the structure of FIG. 10.
Figure 15:
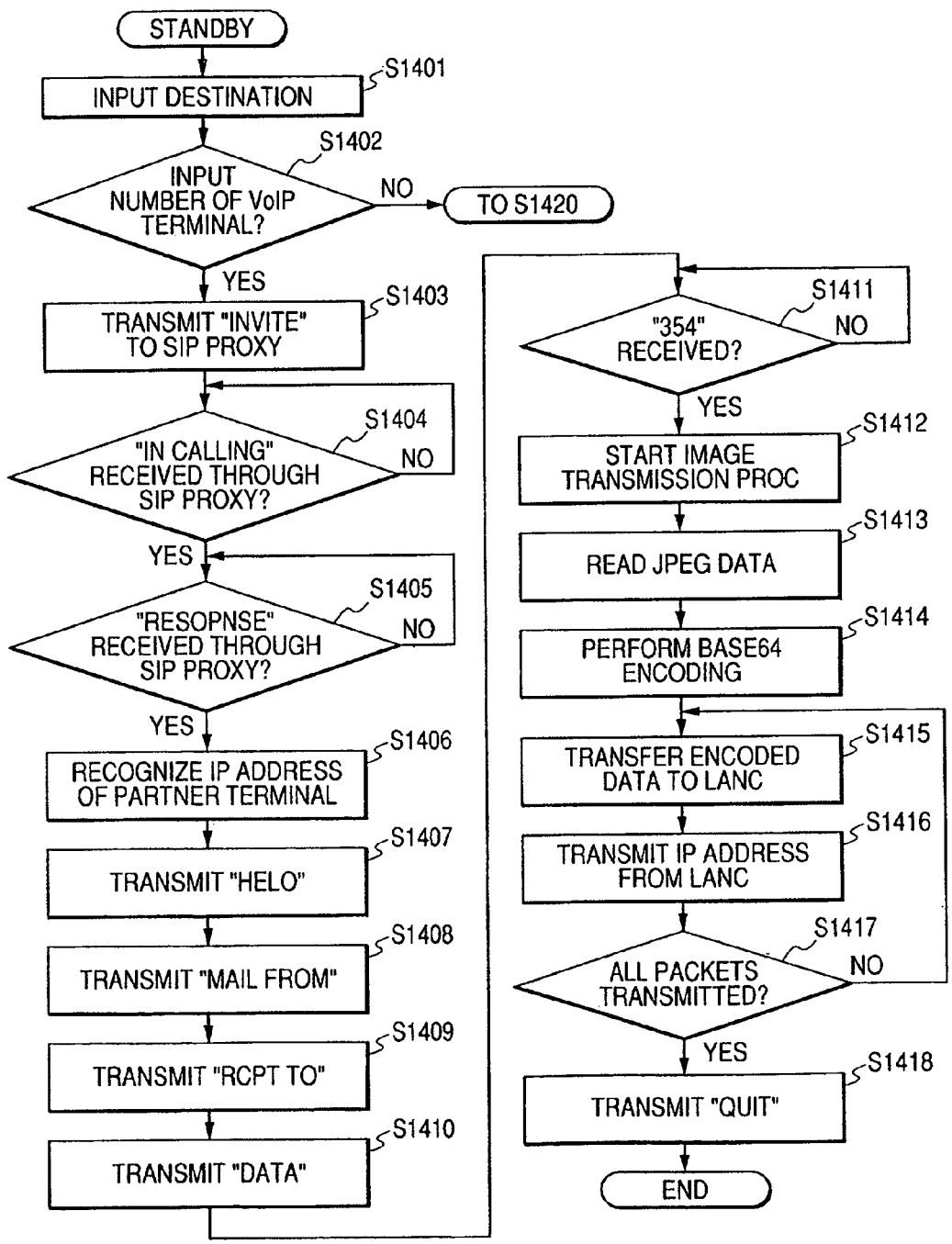
FIG. 15 is a flow chart showing an image transmission procedure (IP communication) according to the present invention (second embodiment)
Figure 16:
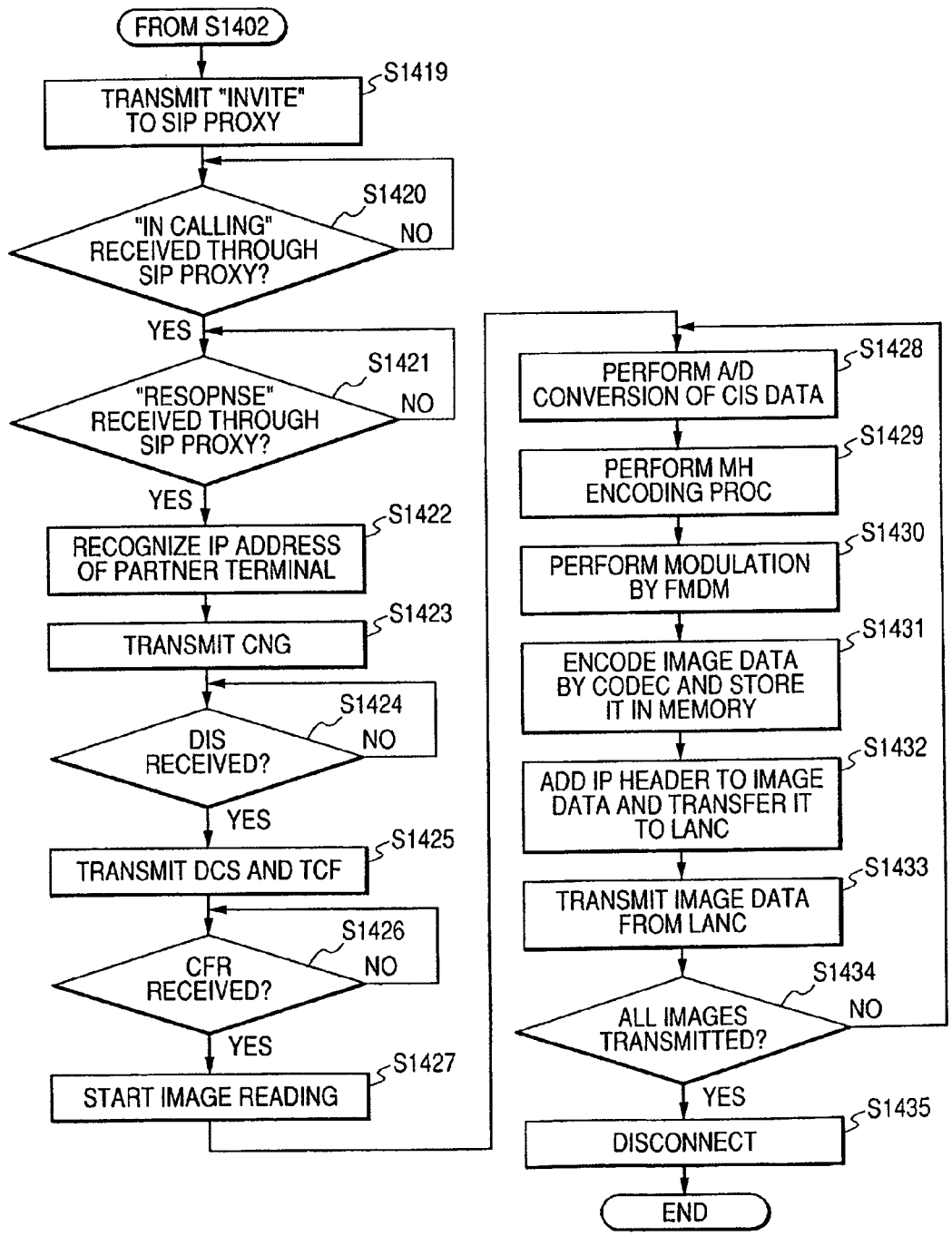
FIG. 16 is a flow chart showing an image transmission procedure (analog facsimile signal communication) according to the present invention (second embodiment)
Figure 17:
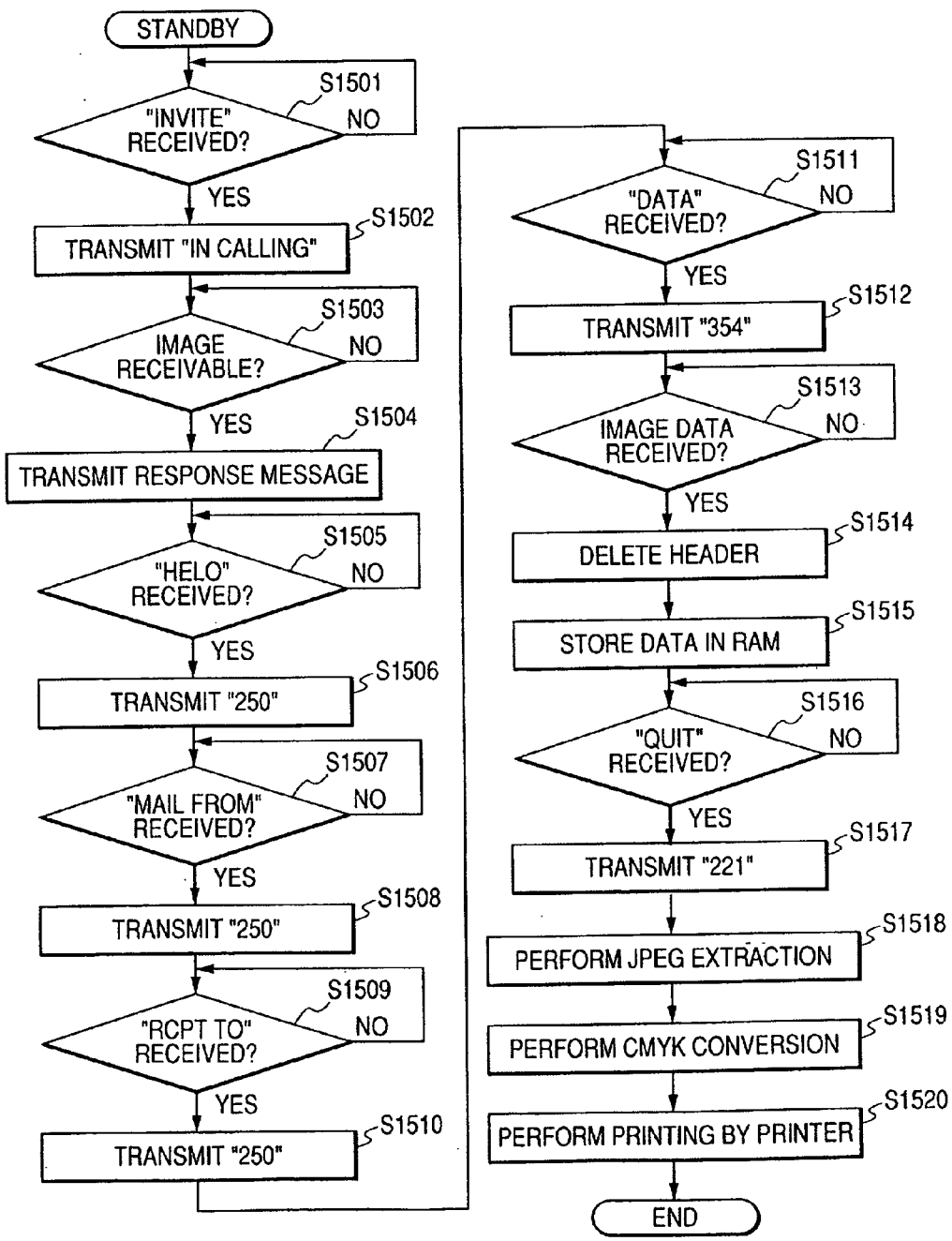
FIG. 17 is a flow chart showing a communication control procedure (IP communication) of the image communication apparatus on a reception side according to the present invention (second embodiment)
Figure 18:
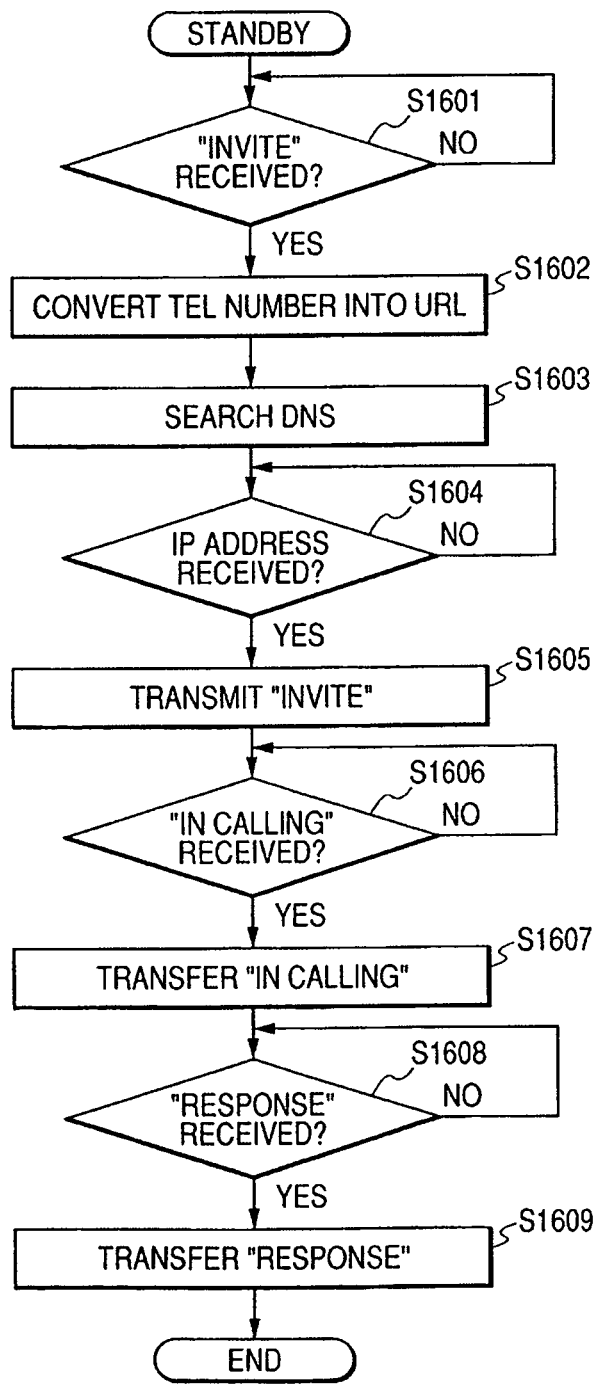
FIG. 18 is a flow chart showing a communication control procedure of an SIP proxy (or SIP proxy server)
Figure 19:
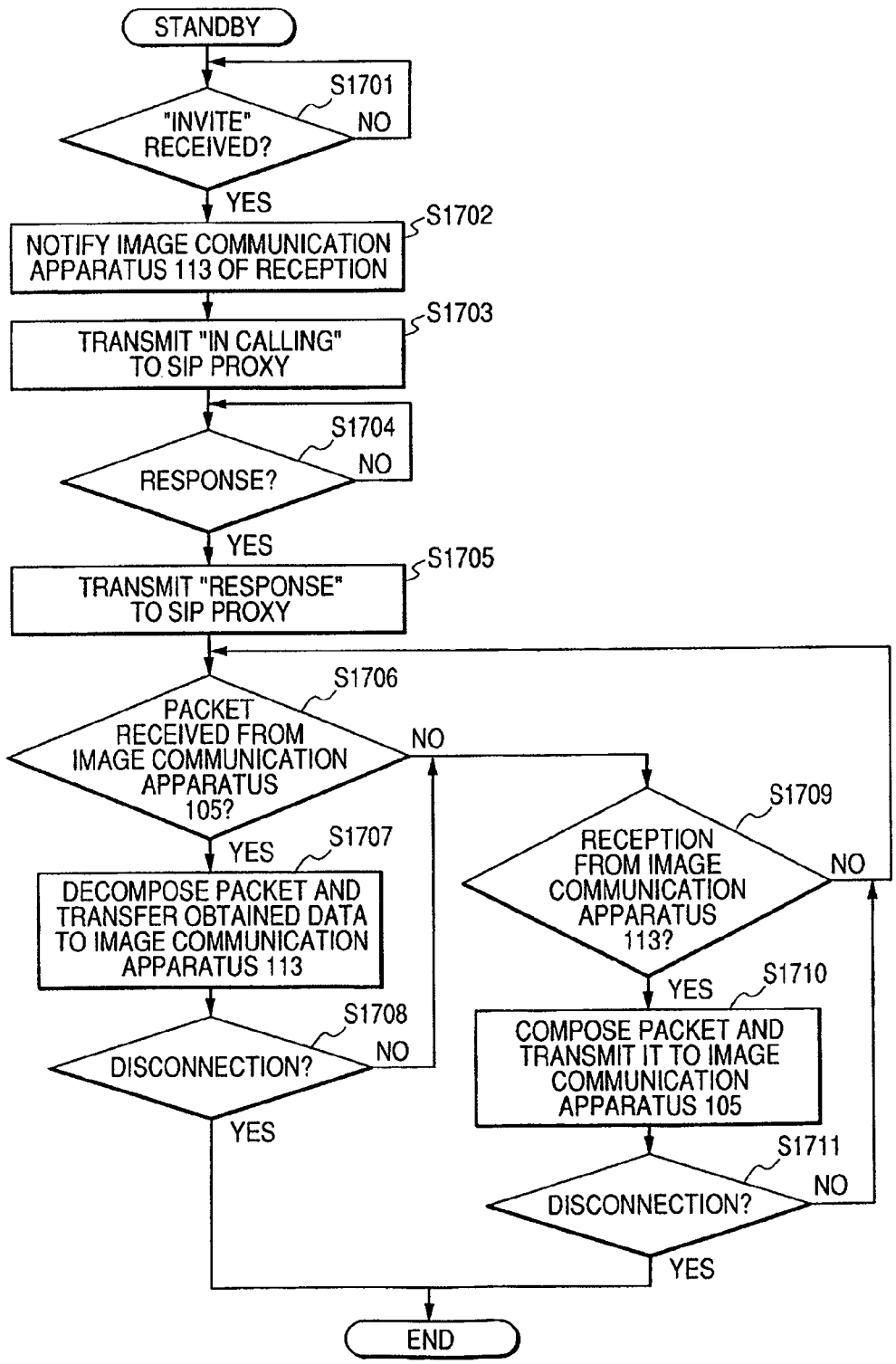
FIG. 19 is a flow chart showing a communication control procedure of a facsimile gateway according to the present invention (second embodiment)

FIGS. 15 and 16 are flow charts respectively showing communication control procedures to be executed by the image communication apparatus 105 on the transmission side, and FIG. 17 is a flow chart showing a communication control procedure to be executed by the image communication apparatus 107 on the reception side. FIGS. 12 and 13 are diagrams for explaining communication sequences executed in the communication control shown in FIGS. 15 to 17, and the step numbers shown in FIGS. 12 and 13 are respectively corresponding to those shown in FIGS. 15 to 17. Moreover, FIG. 18 is a flow chart showing a communication control procedure of the SIP proxy 103, FIG. 19 is a flow chart showing a communication control procedure of the facsimile gateway 1111, and FIG. 20 is a flow chart showing a communication control procedure of the image communication apparatus 113. In the following, the communication control according to the present embodiment will be explained with reference to FIGS. 12, 13 and 15 to 20.

When a destination number is input by a key operation unit 204 of the image communication apparatus (step S1401 in FIG. 15), the input destination number is analyzed by the CPU 201. For example, when the input destination number is "050-1234-5678", it is judged based on the forehand three figures (prefix) "050" that the communication is performed to the destination (communication partner) which can perform communication through the VoIP network (step S1402), a session request message (INVITE) of SIP including the telephone number information is transmitted through a CSMA/CD interface 110 connected to the ADSL gateway 106 (step S1403). In that case, the global IP address "191.168.0.1" of the SIP proxy 103 is set to the transmission destination address of the session request message.

Incidentally, an internal operation to transmit an SIP packet is as follows. Initially, the CPU 201 generates the session request message in which, as the header, the telephone number information input from the key operation unit 204 is added to the transmission destination and the telephone number information of the image communication apparatus 105 is added to the transmission source, on the basis of the program stored in a ROM 202. Subsequently, the CPU 201 generates the frame in which an IP header including the transmission destination IP address and the transmission source IP address is added to the above message, and transfers the generated frame to the LANC 213. In that case, the IP address "191.168.0.1" of the SIP proxy is set to the transmission destination IP address, and the IP address "192.168.0.1" of the image communication apparatus 105 is set to the transmission source IP address.

When the transmission data is received, the LANC 213 adds an MAC (Media Access Control) header to the received data, and transmits the obtained data to the ADSL gateway 106 (FIG. 3). Then, when the data is received, the ADSL gateway 106 transmits it to the IP network 101. Subsequently, various messages are transmitted according to the same procedure.

Because the IP address of the SIP proxy is included as the transmission destination IP address, the packet in question is transmitted to the SIP proxy 103 through the IP network 101 (step S1601 in FIG. 18).

The SIP proxy 103 extracts the telephone number in the header of the received session request message into URL such as "8.7.6.5.4.3.2.1.e164.arpa" (step S1602), and then searches a DNS server 104 (step S1603). Then, the SIP proxy 103 receives the IP address of the communication partner's image communication apparatus 107 from the DNS server 104 (step S1604), replaces the transmission destination IP address in the packet received from the image communication apparatus 105 with the IP address of the image communication apparatus 107 received from the DNS server 104, replaces the transmission source IP address with the IP address of the SIP proxy 103, and then transmits the session request message to the image communication apparatus 107 (step S1605).

Subsequently, the image communication apparatus 107 receives the session request message (step S1501 in FIG. 17), and transmits an "in calling" message to the SIP proxy 103 (step S1502). In that case, the transmission source telephone number information described in the header of the received session request message is set to the destination in the header of the "in calling" message, and the address of the SIP proxy 103 being the transmission source IP address of the session request message is set to the transmission destination IP address.

When the "in calling" message is received (step S1606 in FIG. 18), the SIP proxy 103 replaces the transmission destination IP address with the IP address of the image communication apparatus 105, replaces the transmission source IP address with the IP address of the SIP proxy 103, and transmits this message (step S1607). Then, the image communication apparatus 105 receives the "in calling" message (step S1404).

Subsequently, when the image communication apparatus 107 is in a receivable state (step S1503 in FIG. 17), the image communication apparatus 107 transmits a response message to the SIP proxy 103 (step S1504). When the response message "RESPONSE" is received (step S1608 in FIG. 18), the SIP proxy 103 replaces only the transmission destination IP address with the IP address of the image communication apparatus 105, and then transmits this message (step S1609). Then, the image communication apparatus 105 receives the response message "RESPONSE" through the SIP proxy 103 (step S1405 in FIG. 15).

The image communication apparatus 105 can confirm the IP address of the image communication apparatus 107 on the basis of the transmission source IP address in the received response message (step S1406). Therefore, it is thereafter possible for the image communication apparatus 105 to transmit a packet to the image communication apparatus 107 without using the SIP proxy 103.

Thus, in and after a step S1407, the image data can be transmitted and received between the image communication apparatus 105 and the image communication apparatus 107. In that case, because it has been known based on the telephone number that the communication partner station is connected to the VoIP network, it is of course possible to perform later-described image communication according to a non-facsimile procedure.

In and after the step S1407, the image data is composed to a TCP/IP frame to be transmitted, and the IP address of the image communication apparatus 107 is added to the transmission destination address. In any case, it should be noted that an arbitrary protocol can be used as a file transfer protocol corresponding to the upper layer of TCP/IP used in transmitting the image data. More specifically, generally used SMTP (Simple Mail Transfer Protocol), IPP FAX (Internet Printing Protocol FAX), FTP (File Transfer Protocol), HTTP (HyperText Transfer Protocol), methods obtained by applying these protocols, and the like can be used.

Before the image data is transmitted, the image communication apparatus 105 transmits an image transmission request message to the image communication apparatus 107. Then, when an image transmission permission message is received from the image communication apparatus 107, the image communication apparatus 105 initiates the file transfer protocol and starts the image transmission process.

In the present embodiment, it is assumed that each of the image communication apparatuses 105 and 107 contains both SMTP client and server functions, whereby an image file can be transferred between these apparatuses. In this connection, an example that the image data is transmitted and received based on SMTP in and after the step S1407.

Although the flow chart of FIG. 15 schematically shows that the communication messages are exchanged, such exchange will be explained in more detail hereinafter (with respect to the details of SMTP message, RFC821 and RFC822 should be referred). Here, it should be noted that these messages are all transmitted and received on the TCP/IP frame. In the following sequence, symbol "S:" denotes a text message which is transmitted by the transmission terminal (image communication apparatus 105) through an SMTP port, and symbol "R:" denotes a text message which is transmitted by the reception terminal (image-communication apparatus 107) through the SMTP port.

S: HELO Image Terminal 105
R: 250 Image Terminal 107
S: MAIL FROM: <192.168.0.1>
R: 250 OK
S: RCPT TO: <193.168.0.1>
R: 250 OK
S: DATA
R: 354 Start mail input; end with <CRLF>.<CRLF>
S: XXXXXXXXXXXXXX (Image Data)
S: XXXXXXXXXXXXXX (Image Data)
S:
R: 250 OK
S: QUIT
R: 221

Before the image data is transmitted, the image communication apparatus 105 starts a SMTP handler (program) stored in the ROM 202, and transmits the message "HELO" indicating a communication start (step S1407 in FIG. 15). In response to this, the image communication apparatus 107 transmits the message "250" indicating that the message has been received (steps S1505 and S1506 in FIG. 17).

Then, the image communication apparatus 105 transmits the SMTP message "MAIL FROM: <192.168.0.1>" (step S1408). When the SMTP message is received, the image communication apparatus 107 transmits the message "250" indicating that the SMTP message has been received (steps S1507 and S1508 in FIG. 17).

Next, the image communication apparatus 105 transmits the SMTP message "RCPT TO: <193.168.0.1>" designating the reception side (step S1409). In response to this, when the response message is received from the image communication apparatus 107 (steps S1509 and S1510), the image communication apparatus 105 transmits the message "DATA" indicating a data transmission start (step S1410). In response to this, the image communication apparatus 107 transmits the message "354" indicating permission of the data transmission start (steps S1511 and S1512). When the message "354" is received from the image communication apparatus 107 (step S1411), the image communication apparatus 105 starts image data transmission (step S1412).

Here, it should be noted that the image data is transmitted in the form of an attached file of an electronic mail. Because an MIME (Multipurpose Internet Mail Extensions) format is widely used as an electronic mail attached file format, this format is used in the present embodiment. More specifically, the image data format is first designated by an MIME header, and the image data encoded according to BASE64 is transmitted subsequent to the MIME header (corresponding to "S: XXXXXXXXXXXXXX (Image Data)" in the above protocol sequence).

When the image data is transmitted by the image communication apparatus 105, the CPU 201 reads the JPEG image data stored in a memory card through the card I/F 211 (step S1413 in FIG. 15), performs an encoding process to the read data according to BASE64 (step S1414), and transfers the encoded image data to the LANC 213 (step S1415). Then, the LANC 213 generates a data packet with respect to each certain amount of data, adds the previously received IP address "193.168.0.1" of the image communication apparatus 107 to the IP header, and then transmits the obtained data packet (step S1416).

On one hand, in the image communication apparatus 107 which received the image data (step S1513), an unnecessary header in the electronic mail text is deleted by the LANC 213 or the CPU 201 (step S1514 in FIG. 17), a decoding process according to BASE64 is performed to the MIME encoded portion in the electronic mail text to restore the JPEG data, and the restored data is stored in the RAM 203 (step S1515).

When all the JPEG image data are transmitted from the image communication apparatus 105 (step S1417 in FIG. 15), the end message "QUIT" is transmitted from the image communication apparatus 105 to the image communication apparatus 107 (step S1418), and further the end response message "221" is transmitted from the image communication apparatus 107 (steps S1516 and S1517 in FIG. 17), whereby the image communication based on SMTP ends.

After then, in the image communication apparatus 107, the received JPEG image data is extracted by a JPEG processing unit 212 (step S1518 in FIG. 17), the extracted data is further converted into C, M, Y, K four-color data by a recording processing unit 214 (step S1519), and the color data are printed and output by a printer unit (step S1520).

Thus, it is possible by the above procedure to achieve high-speed image transmission without using the facsimile protocol. Here, when it is assumed that the data size of a JPEG image taken by a digital camera is 300 KB and upload transmission speed of the ADSL is 1 Mbps, a time necessary for the data transmission is about 300K÷(1000K÷8)=2.4 seconds at most.

In the meantime, when it is judged in the image communication apparatus 105 that the telephone number input in the step S1402 of FIG. 15 is the number of the line switching network (102) such as "03-1234-5678", the telephone number in question is considered to correspond to the communication partner which performs communication through the line switching network (102) based on the prefix of its forehand two figures "03", that is, it is judged that calling to the image communication apparatus 113 of FIG. 10 is issued. In that case, the image communication apparatus 105 performs the communication with the image communication apparatus 113 connected to the line switching network 102 by using the facsimile gateway 1111.

First, a session request message (INVITE) of SIP including the telephone number information is transmitted through the CSMA/CD interface 110 connected to the ADSL gateway 106 (FIG. 3) (step S1419 in FIG. 16). In that case, the global IP address "191.168.0.1" of the SIP proxy 103 is set to the transmission destination address of the session request message.

Here, it should be noted that the telephone number information input from the key operation unit 204 is included at the destination in the header of the session request message, and the telephone number information of the image communication apparatus 105 is included at the transmission source in the header. Moreover, the IP address of the SIP proxy 103 is stored in the transmission destination IP address of the IP packet which stores the session request message, and the IP address of the image communication apparatus 105 is stored in the transmission source IP address.

The SIP proxy 103 extracts the telephone number in the header of the received session request message into URL such as "8.7.6.5.4.3.2.1.3.0.e164.arpa" (step S1602 in FIG. 18), and then searches the DNS server 104 (step S1603). The SIP proxy which received the IP address of the gateway 1111 for connecting the line switching network 102 from the DNS server 104 (step S1604) replaces the transmission destination IP address in the packet received from the image communication apparatus 105 with the IP address "192.168.0.2" of the gateway 1111 received from the DNS server 104, replaces the transmission source IP address with the IP address of the SIP proxy 103, and then transmits the session request message to the gateway 1111 (step S1605).

When the session request message is received (step S1701 in FIG. 19), the gateway 1111 notifies the image communication apparatus 113 of the reception through the line switching network 102 (step S1702). At the same time, the gateway 1111 transmits the "in calling" message to the SIP proxy 103 (step S1703). In that case, the transmission source telephone number information described in the header of the received session request message is set to the destination in the header of the "in calling" message, and the address of the SIP proxy 103 being the transmission source IP address of the session request message is set to the transmission destination IP address.

When the "in calling" message is received (step S1606 in FIG. 18), the SIP proxy 103 replaces the transmission destination IP address with the IP address of the image communication apparatus 105, replaces the transmission source IP address with the IP address of the SIP proxy 103, and transmits this message (step S1607). Then, the image communication apparatus 105 receives the "in calling" message (step S1420 in FIG. 16).

Subsequently, when the image communication apparatus 113 which received the "in calling" message is in a receivable state (steps S1801 and S1802 in FIG. 20), the image communication apparatus 113 transmits the response message to the gateway 1111 through the line switching network 102 (step S1803). When the response message is received (step S1704), the gateway 1111 transmits the response message to the SIP proxy 103 (step S1705). Then, the SIP proxy 103 which received the response message converts only the transmission destination IP address into the IP address of the image communication apparatus 105, and transmits the response message. After then, the image communication apparatus 105 receives the response message "RESPONSE" (step S1421).

The image communication apparatus 105 can confirm the IP address of the gateway 1111 on the basis of the transmission source IP address in the received response message (step S1422). Therefore, it is thereafter possible for the image communication apparatus 105 to perform the communication with the image communication apparatus 113 through the IP network 101, the gateway 1111 and the line switching network 102, that is, without using the SIP proxy 103.

By the above procedure, it is possible to start the data transmission/reception between the image communication apparatus 105 and the image communication apparatus 107.

When it becomes possible to perform the data transmission/reception between the image communication apparatus 105 and the image communication apparatus 107, the image communication apparatus 105 modulates the image data to be transmitted into the analog signal in a method defined based on ITU-T Recommendation T.30, and then performs PCM (pulse code modulation) encoding. Then, the PCM encoded data is composed to a packet format having a predetermined length, and the obtained packet is transmitted to the image communication apparatus 107 through the gateway 1111.

Hereinafter, a procedure to transmit black/white original image data read by a CIS 206 and a reading control unit 207 will be explained in detail.

When it becomes possible to perform the data transmission/reception between the image communication apparatus 105 and the image communication apparatus 113, a CNG signal is input to the VoIP codec 1210 in the image communication apparatus 105 through the analog switch 1209, and the input CNG signal is PCM encoded.

The PCM encoded facsimile signal (CNG) is transferred and stored in the RAM 203 through the data path under the control of the CPU 201. Subsequently, at the point that the PCM encoded data of 512 bytes are stored, the CPU 201 generates the frame in which an IP header including the transmission destination IP address and the transmission source IP address is added to the above data, and transfers the generated frame to the LANC 213. In that case, the IP address "191.168.0.2" of the facsimile gateway 1111 is set to the transmission destination IP address, and the IP address "192.168.0.1" of the image communication apparatus 105 is set to the transmission source IP address.

When the transmitted data is received, the LANC 213 adds an MAC (Media Access Control) header to the received data, and then transmits the obtained data to the ADSL gateway 106 (step S1423 in FIG. 16).

Subsequently, the ADSL gateway 106 further transmits the packet to the IP network through the ADSL. Because the transmission destination IP address of the packet is the facsimile gateway 1111, this packet is finally transmitted to the facsimile gateway 1111 through the IP network 101.

When the packet is received from the image communication apparatus 105 (step S1706 in FIG. 19), it is judged by the facsimile gateway 1111 that the received packet should be transmitted to the image communication apparatus 113 through the line switching network 102. Thus, in the facsimile gateway 1111, the PCM encoded data is extracted from the received packet, a PCM decoding process is performed to the extracted data, and the processed data is then converted into the analog facsimile signal (step S1707). The converted analog facsimile signal is transmitted to the image communication apparatus 113 through the line switching network 102.

In the meantime, when the facsimile gateway 1111 receives the analog signal from the image communication apparatus 113 (step S1709), it is judged by the facsimile gateway 1111 that the received signal should be transmitted to the image communication apparatus 105. Thus, the facsimile gateway 1111 causes the hardware similar to the VoIP codec 1210 to compose a packet for the image communication apparatus 105 and transmits the obtained packet to the image communication apparatus 105 (step S1710).

By such a procedure, the facsimile signal is transmitted from the image communication apparatus 105 to the image communication apparatus 113, whereby it is possible to obtain the environment equivalent to the case where the facsimile communication is performed through the ordinary analog telephone line. Therefore, according to the present embodiment, the image communication apparatus 105 only has to perform mere the same process as the conventional facsimile communication except for the PCM encoding of the facsimile signal, and the image communication apparatus 113 may perform merely the same operation as the conventional facsimile procedure based on ITU-T Recommendation T.30 (steps S1708 and S1711).

Hereinafter, an operation after the CNG signal was transmitted/received between the image communication apparatus 105 and the image communication apparatus 113 will be briefly explained.

When the CNG signal is received (step S1804 in FIG. 20), the image communication apparatus 113 transmits a DIS (step S1805). Then, when the DIS is received (step S1424 in FIG. 16), the image communication apparatus 105 transmits a DCS and a TCF (step S1425). Subsequently, when the DCS and the TCF are received (step S1806 in FIG. 20), the image communication apparatus 113 transmits the CFR signal (step S1807).

Next, when the CFR signal is received (step S1426 in FIG. 15), the image communication apparatus 105 starts image reading (step S1427). In the image data transmission, the analog signal input from the CIS 206 is subjected to A/D conversion while an original is being moved under the control of the reading control unit 207 (step S1428). Subsequently, the converted image data is subjected to the MH encoding to achieve the data compression by an MH processing unit 208 (step S1429), and the image data subjected to the MH encoding is input to the FMDM 209 and thus modulated into the analog signal (step S1430). As well as the control signal such as the CNG signal or the like, the obtained analog signal is subjected to the PCM encoding by the VoIP codec 1210, and the encoded signal is stored in a RAM 203 (step S1431). Subsequently, the frame including the added IP header is composed and is transferred to the LANC 213 in units of predetermined byte number (step S1432), the MAC address is added to the transferred frame, and then the frame is transmitted to the image communication apparatus 113 through the facsimile gateway 1111 (step S1433). When the transmission of all the image data ends (step S1434), the line is disconnected and thus the process ends (step S1435).

In the image communication apparatus 113 which received the image data (step S1808), the received image data is demodulated by the FMDM 209 (step S1809), the demodulated data is decoded by the MH processing unit 208 (step S1810), the decoded data is further converted into C, M, Y, K four-color data by the recording processing unit 214 (step S1811), and the color data are printed and output by a printer unit (step S1812).

As above, on one hand, it is thus possible to achieve the high-speed image transmission/reception between the image communication apparatus 105 and the image communication apparatus 107 having the function to connect to the VoIP network. Moreover, on the other hand, it is also possible to achieve the image transmission/reception between the image communication apparatus 105 and the image communication apparatus 113 having only the conventional facsimile function through the facsimile gateway 1111 according to the facsimile communication procedure for exchanging the digitally converted analog facsimile signal (ITU-T Recommendation V.30).

According to the present embodiment, such significant effects as follows can be obtained.

That is, the image communication apparatus can perform the high-speed image transmission/reception to/from the partner image communication apparatus having the function to connect to the VoIP network. Moreover, completely by the user's operation procedure, the image communication apparatus can perform the image transmission/reception to/from the partner image communication apparatus connected only to the line switching network having only the conventional facsimile function through the facsimile gateway 1111 according to the facsimile communication procedure.

In the above-described two kinds of image communication, it is possible to reduce costs by using the network interface connecting only to the IP network. That is, in the present embodiment, because the facsimile gateway 1111 is used as the facsimile signal transmission path, the network interface can be unified to only the IP network interface, whereby the line switching network interface (NCU, corresponding analog signal cable, etc.) used in the first embodiment can be omitted. Thus, the entire structure of the image communication apparatus can be simplified, the costs thereof can be lowered, and further the wirings necessary when setting the apparatus can be simplified. Moreover, in the present embodiment, in the case where the image transmission/reception is performed through the facsimile gateway 1111 according to the facsimile communication procedure, the VoIP codec 1210 which is used for the digital conversion of the voice signal of the IP telephone is also used for the digital conversion of the analog facsimile signal to be transmitted to the facsimile gateway 1111, whereby the circuit structures of the image communication apparatus can be manufactured extra-easily at extremely low cost.

Incidentally, in the second embodiment, SMTP is used as the communication protocol by way of example when the image data is transmitted from the image communication apparatus 105 to the image communication apparatus 107. However, it is needless to say that another communication protocol (e.g., FTP or HTTP used in the first embodiment) on TCP/IP can be also used.

For example, image data transmission in a peer-to-peer method can be achieved even if IPP FAX is used as the protocol. Incidentally, it should be noted that IPP is the protocol (RFC3239, RFC3380, RFC3381, RFC3382, etc. should be referred) which is used to transmit/receive print data on the Internet by applying HTTP, and IPP FAX is the protocol which is used to perform facsimile communication by using IPP.

Figure 14:
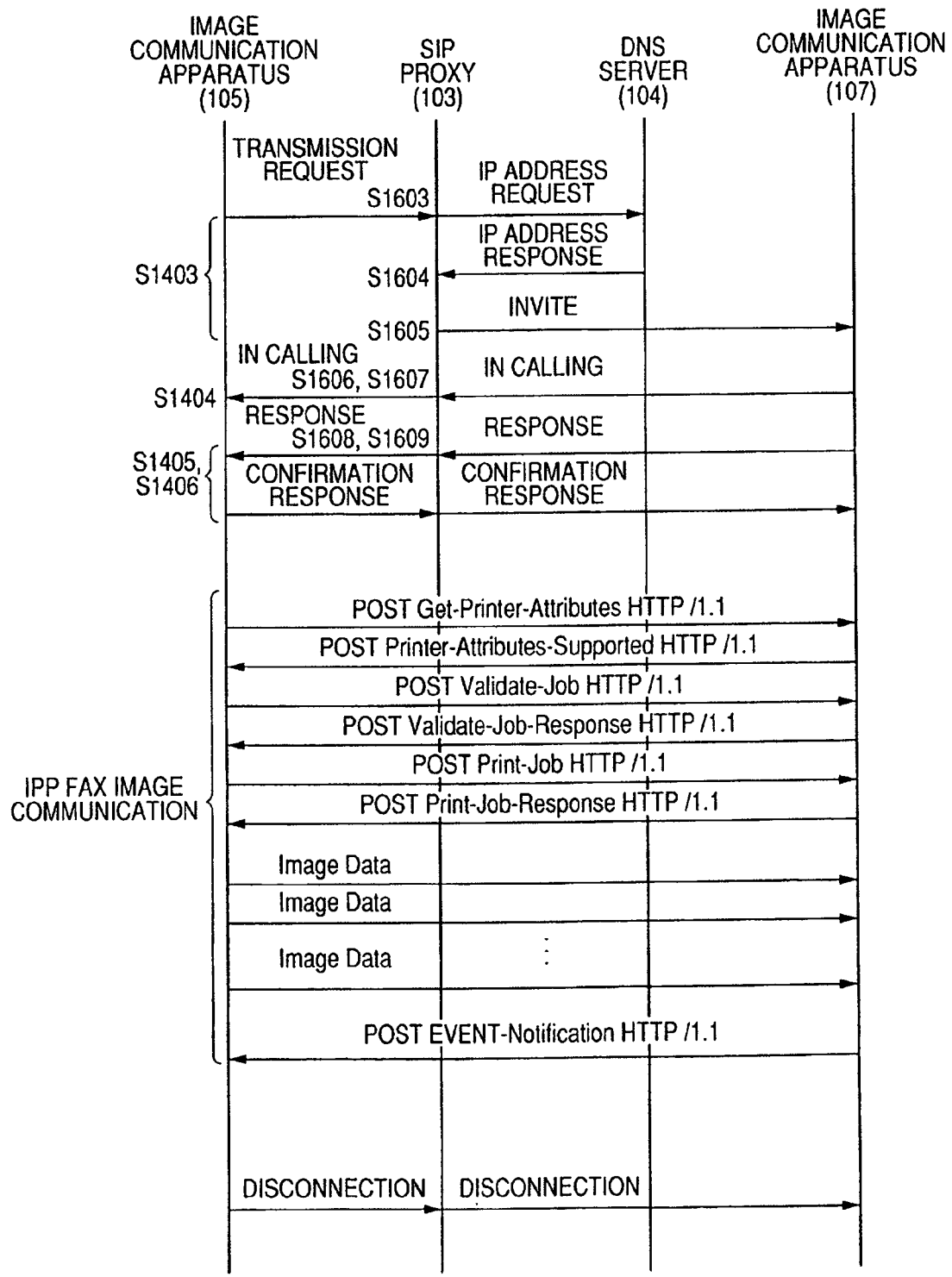
FIG. 14 is a diagram for explaining a communication sequence to transmit image data in IP communication (IPP FAX (Internet Printing Protocol of Facsimile) by using VoIP/SIP, in the structure of FIG. 10.

FIG. 14 shows a communication sequence in case of transmitting image data based on IPP FAX. As shown in FIG. 14, a calling procedure up to the establishment of the connection between the image communication apparatuses 105 and 107 is controlled by the same processes as those shown in FIG. 12, FIG. 15 (steps S1401 to S1406), FIG. 18 (steps S1601 to S1609), and the like. Here, it should be noted that FIG. 14 is different from FIG. 12 in the point concerning the image data transmission/reception procedure after the image communication apparatuses 105 and 107 respectively recognized the mutual IP addresses, that is, in FIG. 14 the image data is transmitted/received by exchanging IPP FAX messages.

Moreover, the second embodiment exemplifies that the JPEG image data of the memory card is transmitted in case of the image data transmission from the image communication apparatus 105 to the image communication apparatus 107, and the image data read by the CIS 206 is transmitted in case of the image data transmission from the image communication apparatus 105 to the image communication apparatus 113. However, the second embodiment is absolutely one example. That is, it is needless to say that the input method, the format at the image input and the combination thereof do not limit a subsequent transmission method. For example, it is needless to say that the same communication as above can be achieved even if the combination of the input method and the format at the image input is opposite to the above.

Furthermore, in the second embodiment, it is judged based on the prefix (forehand plural-figure number) of the telephone number whether the data should be transmitted to the destination terminal connected to the IP network or the destination terminal connected to the line switching network. However, it is possible to determine whether a non-facsimile procedure on IP should be used or a facsimile procedure should be used, by previously registering, in a memory, relation between telephone numbers and kinds of network to which partner's terminal is connected and then referring to stored registration information.

Incidentally, the second embodiment exemplifies that the facsimile signal is transmitted through the facsimile gateway 1111 to the communication partner's image communication apparatus which cannot use. IP, for example, the image communication apparatus on the communication partner side which is not connected to the VoIP network but is connected only to the general line switching network. However, VoIP service capable of calling the partner's station in question connected to a general line network (not participating VoIP) might be provided according to a service provider. In that case, it is thought to perform the communication to the partner's station using VoIP without using the above facsimile gateway and then transmit an image using the facsimile procedure on such a voice communication channel. In this instance, the image transmission is performed by transmitting/receiving a facsimile signal of ITU-T Recommendation T.30 on a VoIP channel formed in any one of zones up to the VoIP gateway finally connecting to the partner's station. Here, it should be noted that the zone to be used is different according to a kinds of service by the provider.

As apparent from the above explanation, the present invention is directed to the communication apparatus which has the IP communication means and transmits/receives the communication data to/from the partner station identified by the telephone number, the control method of the communication apparatus, and the control program for the communication apparatus. More specifically, in the present invention, the IP address of the communication partner station is obtained from the predetermined server based on the telephone number of the communication partner station, and the communication data is transmitted/received on the IP network to/from the communication partner station by using the obtained IP address of the communication partner station, based on the predetermined data transmission/reception protocol. Thus, it is possible to obtain the significant effect that the high-speed and high-reliability data communication can be achieved without any complicated operations.

Moreover, when the communication data cannot be transmitted/received on the IP network based on the predetermined data transmission/reception protocol, the communication data is transmitted/received to/from the communication partner station by using the voice band through the facsimile signal transmission path established on the IP network or the line switching network. Thus, it is possible to obtain the significant effect that the high-speed and high-reliability data communication can be achieved by selecting the appropriate communication path without any complicated user operation.

Furthermore, if the facsimile signal transmission path is structured by means of the facsimile gateway for receiving the digitally converted analog facsimile signal and transmitting it to the communication partner station through the line switching network, the network interfaces can be unified to only the IP network interface, whereby the line switching network interface (NCU, corresponding analog signal cable, etc.) can be omitted. Thus, the entire structure of the image communication apparatus can be simplified, the costs thereof can be lowered, and further the wirings necessary when setting the apparatus can be simplified.

Furthermore, if the analog facsimile signal to be transmitted to the facsimile gateway is digitally converted by using the VoIP codec used for the digital conversion of the analog voice signal in the VoIP communication, the circuit structures of the image communication apparatus can be extra-easily manufactured at extremely low cost.

[Third Embodiment]

In the above-described second embodiment, the image communication apparatuses 105 and 107 each of which does not has any NCU is explained.

In the third embodiment, it is further considered how to lower costs for the image communication apparatuses 105 and 107.

In the present embodiment, each of the image communication apparatuses 105 and 107 has the same structure as shown in FIG. 11 except for the FMDM 209, and the same parts as those in the second embodiment will be refrained from being explained.

The present embodiment is different from the second embodiment in the communication portion through the gateway 1111. Hereafter, it should be noted that the present embodiment will be explained with reference to the image communication apparatus device 105 as a representative.

That is, in the present embodiment, the image communication apparatus 105 communicates with the image communication apparatus 113 on the communication partner side according to the SIP as well as the second embodiment.

However, because the image communication apparatus 105 does not contain the FMDM 209 shown in FIG. 11, the image data transmission/reception between the image communication apparatus 105 in the present embodiment and the gateway 1111 is performed in the same manner as that for the image data transmission/reception between the image communication apparatus 105 and the image communication apparatus 107 in the second embodiment, that is, the image data communication according to the non-facsimile procedure is performed. In the present embodiment, as well as the step S1407 and the following steps in the second embodiment, the image data is composed to the TCP/IP frame and transmitted. However, the IP address of the gateway 1111 is added to the transmission destination address. Incidentally, it should be noted that an arbitrary protocol can be used as the file transfer protocol corresponding to the upper layer of TCP/IP used in the image data transmission. More specifically, generally used SMTP (Simple Mail Transfer Protocol), IPP FAX (Internet Printing-Protocol FAX), FTP (File Transfer Protocol), HTTP (HyperText Transfer Protocol), methods obtained by applying these protocols, and the like may be used.

On one hand, the image data communication between the gateway 1111 and the image communication apparatus 113 is performed according to the facsimile procedure, as well as the second embodiment. That is, the gateway 1111 transmits the image data received from the image communication apparatus 105 according to the non-facsimile procedure to the image communication apparatus 113 according to the facsimile procedure.

At that time, an encoding format of the image data to be transmitted from the image communication apparatus 105 to the gateway 1111 may be a format such as MH, MR, MMR, JBIG, JPEG or the like capable of being used in the general facsimile communication. The gateway 1111 receives the image data from the image communication apparatus 105 through the IP network according to the non-facsimile procedure, and then transmits the received image data to the image communication apparatus 113 according to the facsimile procedure. At that time, the gateway 1111 recognizes the reception capability of the image communication apparatus 113 in response to the DIS according to the facsimile procedure (DIS detection). Then, when the encoding format, the resolution and the like of the image data received from the image communication apparatus 105 conform with the reception capability of the image communication apparatus 113, the gateway 1111 transmits the received image data to the image communication apparatus 113 without code conversion, resolution conversion and the like. Meanwhile, when the encoding format, the resolution and the like of the image data do not conform with the reception capability of the image communication apparatus 113, the gateway 1111 performs the code conversion, the resolution conversion and the like in conformity with the reception capability of the image communication apparatus 113, and then transmits the converted image data to the image communication apparatus 113.

After transmitting the image data, the gateway 1111 ends the communication with the image communication apparatus 113 according to the facsimile procedure, and disconnects the image communication apparatus 113. Then, the gateway 1111 notifies according to a non-facsimile protocol the image communication apparatus 105 whether the image data transmission from the gateway 1111 to the image communication apparatus 113 has ended in success, and disconnects the image communication apparatus 105.

Although the image data transmission from the image communication apparatus 105 to the image communication apparatus 113 is explained in the above, the image data can be of course transmitted inversely from the image communication apparatus 113 to the image communication apparatus 105. In that case, the image communication apparatus 113 calls out the telephone number of the image communication apparatus 105. Then, the gateway 1111 detects the telephone number called out by the image communication apparatus 113, and generates a transmission request to the SIP proxy by using the detected telephone number, whereby the gateway 1111 and the image communication apparatus 105 are connected to each other by the SIP. Such a situation of signal transmission/reception can be represented by replacing the image communication apparatus 105 and the gateway 1111 with each other in FIG. 13. Moreover, when the image communication apparatus 105 responds to the transmission request of the SIP, the gateway 1111 transmits a CED (called party tone) signal to the image communication apparatus 113. Thus, the image data communication is performed between the gateway 1111 and the image communication apparatus 113 by using the facsimile protocol, and the gateway 1111 receives the image data from the image communication apparatus 113. Then, the gateway 1111 transmits the image data received from the image communication apparatus 113 to the image communication apparatus 105 according to the non-facsimile protocol.

Subsequently, the gateway 1111 judges whether or not the image data transmission to the image communication apparatus 105 ends in success, and notifies the image communication apparatus 113 of success or unsuccess of the image data transmission by a facsimile procedure signal. After then, the gateway 1111 detects a DCN (disconnection) signal of the facsimile signal transmitted by the image communication apparatus 113, and thus disconnects the image communication apparatus 105. Subsequently, the image communication apparatus 113 disconnects the connection between the image communication apparatus 113 and the gateway 1111.

As described above, according to the third embodiment, each of the image communication apparatuses 105 and 107 can perform the communication even if it does not have the NCU and the FMDM. Thus, because it is unnecessary to provide the FMDM in the image communication apparatus, it is possible to lower the costs in, e.g., manufacturing the apparatus itself as compared with the second embodiment.

The invention claimed is:

1. A communication apparatus including a facsimile communication unit configured to communicate using a facsimile protocol, the apparatus comprising:
   a Voice over Internet Protocol (VoIP) connection unit configured to establish a VoIP channel via an Internet Protocol (IP) network using a VoIP protocol;
   an IP communication unit configured to communicate image data to a communication partner station via the IP network using a file transmission protocol that is one of a plurality of predetermined file transmission protocols;
   a Session Initiation Protocol (SIP) unit configured to obtain an IP address of the communication partner station from a SIP proxy server, based on a telephone number of the communication partner station, and to communicate a SIP signal;
   a determination unit configured to determine whether the communication partner station is capable of using the IP protocol; and
   a control unit configured to select the facsimile communication unit or the IP communication unit, in accordance with a determination by the determination unit,
   wherein, if the determination unit determines that the communication partner station is capable of using the IP protocol and the SIP unit has received a response indicating that the communication partner station is responding to a call, the control unit selects the IP communication unit, and causes the IP communication unit to communicate the image data to the communication partner station using the file transmission protocol using the IP address of the communication partner station obtained by the SIP unit, and, if the determination unit determines that the communication partner station is not capable of using the IP protocol and the SIP unit has received a response indicating that the communication partner station is responding to a call, the control unit selects the facsimile communication unit, and causes the facsimile communication unit to communicate the image data to the communication partner station using the facsimile protocol via the VoIP channel established by the VoIP connection unit.

2. A control method performed by a communication apparatus that includes a facsimile communication unit configured to communicate using a facsimile protocol and an Internet Protocol (IP) communication unit configured to communicate image data to a communication partner station via an IP network using a file transmission protocol that is one of a plurality of predetermined file transmission protocols, the control method comprising:
   a Voice over Internet Protocol (VoIP) connection step of establishing a VoIP channel via the IP network using a VoIP protocol;
   an obtaining step of obtaining an IP address of the communication partner station from a Session Initiation Protocol (SIP) proxy server, based on a telephone number of the communication partner station, and communicating a SIP signal;
   a determining step of determining whether the communication partner station is capable of using the IP protocol; and
   a control step of selecting the facsimile communication unit or the IP communication unit, in accordance with a determination in the determining step,
   wherein, if a determination is made in the determining step that the communication partner station is capable of using the IP protocol and a response indicating that the communication partner station is responding to a call has been received in the SIP step, the IP communication unit is selected, and the image data is communicated to the communication partner station using the file transmission protocol using the IP address of the communication partner station obtained in the obtaining step, and, if a determination is made in the determining step that the communication partner station is not capable of the IP protocol and a response indicating that the communication partner station is responding to a call has been received in the SIP step, the facsimile communication unit is selected, and the image data is communicated to the communication partner station using the facsimile protocol via the VoIP channel established in the VoIP connection step.

3. A non-transitory computer-readable storage medium storing a computer-executable program that, when executed, causes a communication apparatus to perform a control method, wherein the communication apparatus includes a facsimile communication unit configured to communicate using a facsimile protocol and an Internet Protocol (IP) communication unit configured to communicate image data to a communication partner station via an IP network using a file transmission protocol, the control method comprising:

a Voice over Internet Protocol (VoIP) connection step of establishing a VoIP channel via the IP network using a VoIP protocol;

an IP address obtaining step of obtaining an IP address of the communication partner station from a Session Initiation Protocol (SIP) proxy server, based on a telephone number of the communication partner station, and communicating a SIP signal;

a determining step of determining whether the communication partner station is capable of using the IP protocol; and a control step of selecting the facsimile communication unit or the IP communication unit, in accordance with a determination in the determining step, wherein, if a determination is made in the determining step that the communication partner station is capable of using the IP protocol and a response indicating that the communication partner station is responding to a call has received in the SIP step, the IP communication unit is selected, and the image data is communicated to the communication partner station using the file transmission protocol using the IP address of the communication partner station obtained in the IP address obtaining step, and, if a determination is made in the determining step that the communication partner station is not capable of using the IP protocol and a response indicating that the communication partner station is responding to a call has been received in the SIP step, the facsimile communication unit is selected, and the image data is communicated to the communication partner station using the facsimile protocol via the VoIP channel established in the VoIP connection step.

4. A communication apparatus including a facsimile communication unit configured to communicate using a facsimile protocol, the apparatus comprising:

a Voice over Internet Protocol (VoIP) connection unit configured to establish a VoIP channel via an Internet Protocol (IP) network using a VoIP protocol;

an IP communication unit configured to communicate image data to a communication partner station via the IP network using a file transmission protocol that is one of a plurality of predetermined file transmission protocols;

a Session Initiation Protocol (SIP) unit configured to obtain an IP address of the communication partner station from a SIP proxy server, based on a telephone number of the communication partner station, and to communicate a SIP signal; and a control unit configured to select the facsimile communication unit or the IP communication unit to communicate the image data to the communication partner station, wherein, if the SIP unit has received a response indicating that the communication partner station is responding to a call, the control unit selects the facsimile communication unit and causes the facsimile communication unit to communicate the image data to the communication partner station using the facsimile protocol via the VoIP channel established by the VoIP connection unit.

5. The communication apparatus according to claim 4, further comprising:

a determination unit configured to determine whether the communication partner station is capable of using the IP protocol, wherein, if the determination unit determines that the communication partner station is capable of using the IP protocol and the SIP unit has received a response indicating that the communication partner station is responding to a call, the control unit selects the IP communication unit, and causes the IP communication unit to communicate the image data to the communication partner station using the file transmission protocol using the IP address of the communication partner station obtained by the SIP unit, and, if the determination unit determines that the communication partner station is not capable of using the IP protocol and the SIP unit has received a response indicating that the communication partner station is responding to a call, the control unit selects the facsimile communication unit, and causes the facsimile communication unit to communicate the image data to the communication partner station using the facsimile protocol via the VoIP channel established by the VoIP connection unit.

6. A control method performed by a communication apparatus that includes a facsimile communication unit configured to communicate using a facsimile protocol and an Internet Protocol (IP) communication unit configured to communicate image data to a communication partner station via an IP network using a file transmission protocol that is one of a plurality of predetermined file transmission protocols, the control method comprising:

a Voice over Internet Protocol (VoIP) connection step of establishing a VoIP channel via an IP network using a VoIP protocol;

an IP communication step of communicating image data to a communication partner station via the IP network using a file transmission protocol that is one of a plurality of predetermined file transmission protocols;

a Session Initiation Protocol (SIP) step of obtaining an IP address of the communication partner station from a SIP proxy server, based on a telephone number of the communication partner station, and communicating a SIP signal; and a control step of selecting the facsimile communication unit or the IP communication unit to communicate the image data to the communication partner station, wherein, if a response indicating that the communication partner station is responding to a call has been received in the SIP step, the facsimile communication unit is selected and the facsimile communication unit is caused to communicate the image data to the communication partner station using the facsimile protocol via the VoIP channel established in the VoIP connection step.

7. The control method according to claim 6, further comprising:

a determining step of determining whether the communication partner station is capable of using the IP protocol, wherein, if a determination is made in the determining step that the communication partner station is capable of using the IP protocol and a response indicating that the communication partner station is responding to a call has been received in the SIP step, the IP communication unit is selected, and the image data is communicated to the communication partner station using the file transmission protocol using the IP address of the communication partner station obtained in the obtaining step, and, if a determination is made in the determining step that the communication partner station is not capable of the IP protocol and a response indicating that the communication partner station is responding to a call has been received in the SIP step, the facsimile communication unit is selected, and the image data is communicated to the communication partner station using the facsimile protocol via the VoIP channel established in the VoIP connection step.

8. A non-transitory computer-readable storage medium storing a computer-executable program that, when executed, causes a communication apparatus to perform a control method, wherein the communication apparatus includes a facsimile communication unit configured to communicate using a facsimile protocol and an Internet Protocol (IP) communication unit configured to communicate image data to a communication partner station via an IP network using a file transmission protocol, the control method comprising:

a Voice over Internet Protocol (VoIP) connection step of establishing a VoIP channel via an IP network using a VoIP protocol;

an IP communication step of communicating image data to a communication partner station via the IP network using a file transmission protocol that is one of a plurality of predetermined file transmission protocols;

a Session Initiation Protocol (SIP) step of obtaining an IP address of the communication partner station from a SIP proxy server, based on a telephone number of the communication partner station, and communicating a SIP signal; and a control step of selecting the facsimile communication unit or the IP communication unit to communicate the image data to the communication partner station, wherein, if a response indicating that the communication partner station is responding to a call has been received in the SIP step, the facsimile communication unit is selected and the facsimile communication unit is caused to communicate the image data to the communication partner station using the facsimile protocol via the VoIP channel established in the VoIP connection step.

9. The non-transitory computer-readable storage medium according to claim 8, further comprising:

a determining step of determining whether the communication partner station is capable of using the IP protocol, wherein, if a determination is made in the determining step that the communication partner station is capable of using the IP protocol and a response indicating that the communication partner station is responding to a call has received in the SIP step, the IP communication unit is selected, and the image data is communicated to the communication partner station using the file transmission protocol using the IP address of the communication partner station obtained in the IP address obtaining step, and, if a determination is made in the determining step that the communication partner station is not capable of using the IP protocol and a response indicating that the communication partner station is responding to a call has been received in the SIP step, the facsimile communication unit is selected, and the image data is communicated to the communication partner station using the VoIP protocol via the VoIP channel established in the VoIP connection step.

\* \* \* \* \*